United States Patent [19]
Gilmore, Jr.

[11] Patent Number: 5,606,653
[45] Date of Patent: Feb. 25, 1997

[54] METHOD OF DISPLAYING DESCRIPTIVE DATA REPRESENTING A CANDIDATE AS A PLURALITY OF LINES ON AN OUTPUT DEVICE

[75] Inventor: John T. Gilmore, Jr., Amherst, N.H.

[73] Assignee: Digital Equipment Corporation, Maynard, Mass.

[21] Appl. No.: 559,278

[22] Filed: Jul. 27, 1990

[51] Int. Cl.$^6$ .................................................. G06F 17/00
[52] U.S. Cl. .......................................................... 395/140
[58] Field of Search ................................... 395/140–143, 395/155, 160, 161

[56] References Cited

U.S. PATENT DOCUMENTS 5,163,129  11/1992  Donato et al. ........................... 395/143

OTHER PUBLICATIONS

Software Digest, MacIntosh Ratings Report, Spreadsheet Programs, Jun. 1989.
The Analytic Hierarchy Process, pp. 17–25 and 249–264, Thomas L. Saaty, 1990.
Decision Making For Leaders, pp. 17, 18, and 75–92, Thomas L. Saaty, 1990.
QFD Capture; User's Reference; pp. 4–3 and 5–91; International TechneGroup, Incorporated; 1990.
Olli T. Ahtola, "The Vector Model of Preferences: An Alternative to the Fishbein Model"; Journal of Marketing Research, vol. 12, Feb. 1975, Paragraph: Quantitative Model.
Waldo R. Tobler, "Experiments in Migration Mapping by Computer"; the American Cartographer, vol. 14, No. 2, 1987, pp. 155–163, Figure 4.

*Primary Examiner*—Almis R. Jankus
*Attorney, Agent, or Firm*—Kenneth F. Kozik

[57] ABSTRACT

A method for displaying discriptive data in which data is presented by vectors with the length of the vector representing one dimension of the data and the angle of the vector representing another dimension of the data. Data having multiple categories is represented by a plurality of component vectors, each extending from the tip of the preceding component vector. The thickness of the vectors represents the variance of the data.

23 Claims, 13 Drawing Sheets

FUNCTIONAL VALUE $f_i$

WEIGHTED FUNCTIONAL SCORE $W_i f_i$

WHERE $\Theta = \sin^{-1} W_i$    THE CUSTOMER IMPORTANCE WEIGHT

RESULTANT FUNCTIONAL VALUE VECTOR AND SUB COMPONENT VECTORS

RESULTANT WEIGHTED FUNCTIONAL SCORE $\bar{f}$

WHERE $\Theta = \sin^{-1} W$    THE RESULTANT CUSTOMER IMPORTANCE WEIGHT

FIG.3
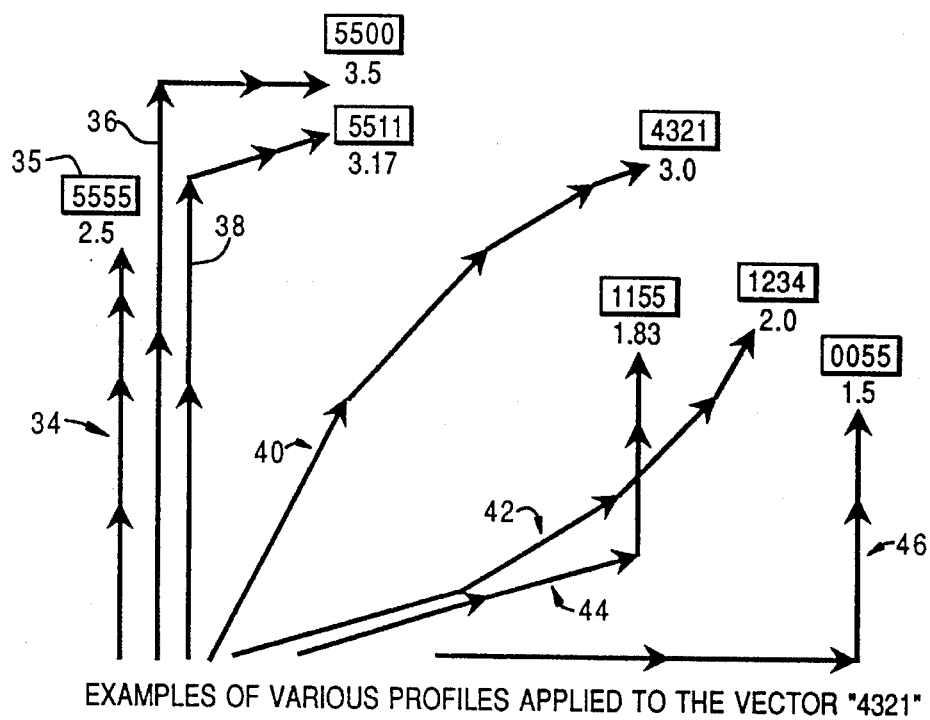
EXAMPLES OF VARIOUS PROFILES APPLIED TO THE VECTOR "4321"
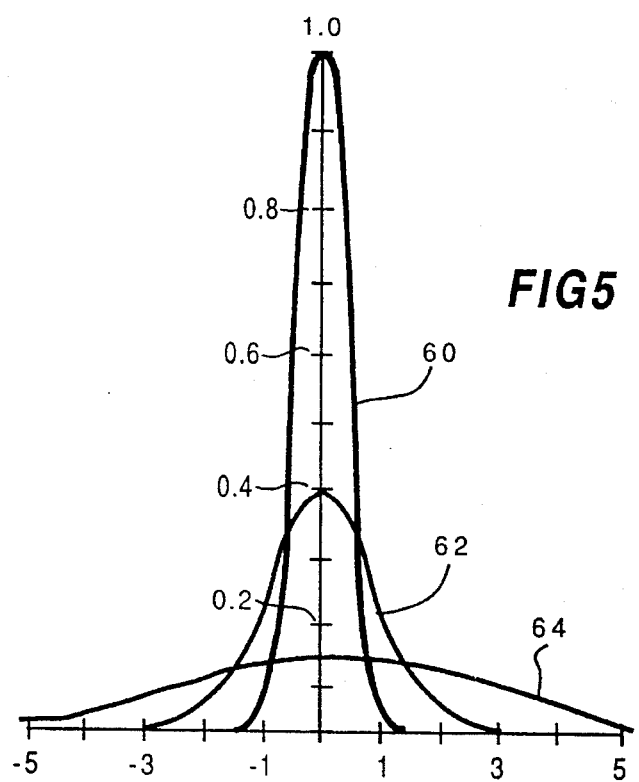
FIG5

FIG. 9

| 3.00 | HIGH END FORMATTING & LAYOUT FUNCTIONS |
|---|---|
| 3.01 | FORMATTING |
| 3.02 | COLUMN FORMATTING |
| 3.03 | JUSTIFICATION |
| 3.04 | DESKTOP PUBLISHING FEATURES |

94

100

| 3.00 | 0 | FORMATTING |
|---|---|---|
| 3.01 | 1 | AUTOMATIC REFORMATTING |
| 3.01 | 2 | AUTOMATIC CHANGES MADE BY MOVING VISIBLE GUIDES |
| 3.01 | 3 | GUTTER MARGINS (BINDING WIDTH) |
| 3.01 | 4 | MEASURE IN INCHES, CM., POINTS |
| 3.01 | 5 | CONDITIONAL PAGE BREAKS (SOFT PAGE BREAKS) |
| 3.01 | 6 | DYNAMIC PAGINATION |
| 3.01 | 7 | REQUIRED PAGE BREAKS |
| 3.01 | 8 | REQUIRED SPACES |
| 3.01 | 9 | SECTIONING (CHAPTERS) |
| 3.01 | 10 | STYLE SHEETS |
| 3.01 | 11 | USER-SPECIFIED TABS |
| 3.01 | 12 | CENTER-JUSTIFIED TABS |
| 3.01 | 13 | DECIMAL TABS |
| 3.01 | 14 | RIGHT-JUSTIFIED TABS |
| 3.01 | 15 | WIDOW/ORPHAN CONTROL |

102

| 3.00 | 0 | COLUMN FORMATTING |
|---|---|---|
| 3.02 | 1 | MAXIMUM COLUMNS ACROSS SCREEN |
| 3.02 | 2 | NEWSPAPER- STYLE COLUMNS |
| 3.02 | 3 | PARALLEL-STYLE COLUMNS |
| 3.02 | 4 | VARIABLE COLUMN WIDTHS |
| 3.02 | 5 | VARIABLE SPACE BETWEEN COLUMNS |
| 3.02 | 6 | DELETE TABULAR COLUMNS |
| 3.02 | 7 | MOVE TABULAR COLUMNS |
| 3.02 | 8 | STRADDLE HEADS FOR SUB-DIVIDED COLUMNS AUTOMATIC |
| 3.02 | 9 | TABLE GENERATION AUTOMATIC |

104

| 3.00 | 0 | JUSTIFICATION |
|---|---|---|
| 3.02 | 1 | BLOCK-JUSTIFIED TEXT |
| 3.02 | 2 | KERNING |
| 3.02 | 3 | WORD OR INTER-CHARACTER (MICRO-) JUSTIFICATION |

106

| 3.00 | 0 | DESKTOP PUBLISHING FEATURES |
|---|---|---|
| 3.02 | 1 | DEGREE OF INTEGRATION |
| 3.02 | 2 | LOADING |
| 3.02 | 3 | MULTIPLE LAYERS |
| 3.02 | 4 | SMART "CURVED" QUOTES |
| 3.02 | 5 | TEXT LINKING (THREADING) |
| 3.02 | 6 | TEXT ROTATION |
| 3.02 | 7 | BALANCED COLUMNS |
| 3.02 | 8 | VERTICAL JUSTIFICATION |

METHOD OF DISPLAYING DESCRIPTIVE DATA REPRESENTING A CANDIDATE AS A PLURALITY OF LINES ON AN OUTPUT DEVICE

BACKGROUND OF THE INVENTION

Making good decisions is an important requirement for leaders in all types of institutions, such as business, industry, and government. Such decisions must often be made regarding choices between candidates. For example, business leaders must often select a product to develop and manufacture, from among candidates consisting of a large number of potential products. Similarly, purchasing managers often decide which product to purchase for use in a company, choosing from candidates consisting of large numbers of products offered for sale by vendors. In the personnel area, employees are hired and promoted by selecting from candidates consisting of many applicants. In the government area, it is often necessary to select a policy from candidates consisting of a number of possible alternative policies.

In some situations, leaders make decisions based on subjective intuitive factors. Good leaders are often those having good instincts permitting wise decisions. In some cases however, decision making must be more objective. This is especially true in situations where the decision maker does not have absolute power, but is required to justify his decision and convince others that his decision is correct.

Objective decision making is often based on numeric data used to describe various factors, or dimensions, of candidates. Such data is often presented in numeric tables. Recently, "spreadsheet" computer programs have become popular as a means for organizing numeric data and generating numeric results presented in tables, based on calculations performed on input data. Spreadsheets permit convenient change of input data to produce almost immediate output. This in turn permits convenient consideration of "what if" questions to observe the influence of various factors upon the final numeric objective output data.

In addition to tables, objective decision making often involves the use of various types of graphs to present numeric data. "Pie" charts and bar graphs, often enhanced with color, have improved the presentation of objective data used in decision making.

Despite recent advances in the ability to manipulate numeric data and display such data in graphical form, it remains difficult to convey and absorb descriptive data, especially where such data is present in multiple dimensions. Such multiple dimensions often require multiple numeric tables and multiple charts. Even those with skill and experience in working with numeric data may have difficulty analyzing and interpreting such multiple charts and tables. Thus, presently known methods of data display do not provide a convenient way to display data having multiple dimensions, in a manner that can be readily absorbed by a decision maker to permit effective selection of choices between various candidates. Accordingly, it is desired to provide a method for displaying data in a manner in which various dimensions of the data can be readily understood, absorbed, and interpreted.

SUMMARY OF THE INVENTION

The present invention overcomes the problems and disadvantages of the prior art by providing a method for displaying descriptive data. In accordance with the purpose of the invention, as embodied and broadly described herein, the invention, in one aspect, comprises the steps of assigning a functional value to each of the features; assigning an importance weight to each of the features; and, for each group, computing an average weighted functional score for the features of the group using the functional value and importance weight of each feature associated with the group. This aspect of the invention comprises the additional steps of assigning an importance weight to each group; displaying a first vector having a length corresponding to the average weighted functional score of the first group and extending at an angle corresponding to the importance weight of the first group; displaying a succeeding vector having a length corresponding to the average weighted functional score of the next group and extending from the tip of the preceding vector at an angle corresponding to the importance weight of the next group; and repeating the preceding step for each remaining group.

BRIEF DESCRIPTION OF THE DRAWINGS

The accompanying drawings, which are incorporated in and constitute a part of this specification, illustrate one embodiment of the invention, and, together with the description, serve to explain the principles of the present invention.

FIG. 3 shows a family of seven vectors each having the same functional values, weighted according to different customer profiles;

FIG. 5 shows a set of Normal Curves having different variances;

FIG. 9 shows the second-highest level of nodes associated with the HIGH END FORMATTING AND LAYOUT FUNCTIONS node of FIG. 8;

DESCRIPTION OF THE PREFERRED EMBODIMENT

Figure 1:
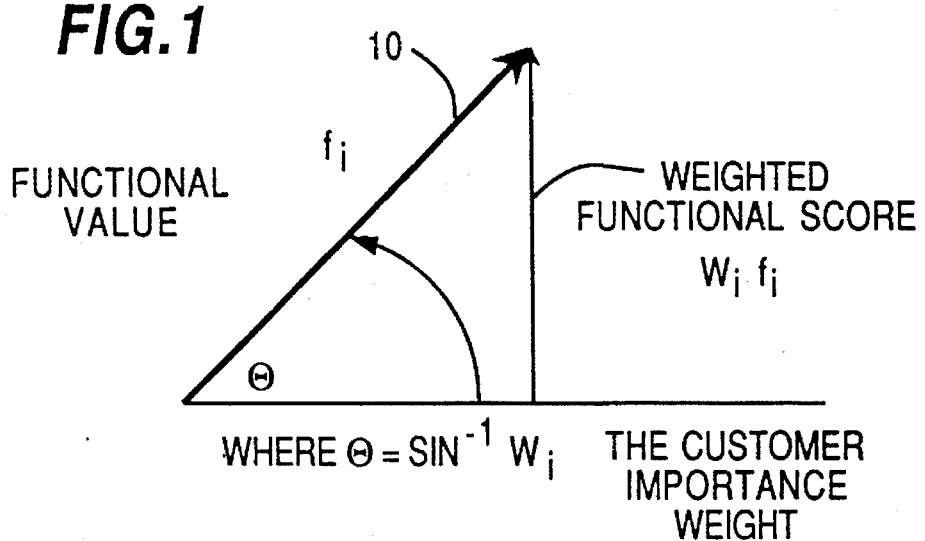
FIG. 1 shows a vector in which the length of the vector represents one dimension of descriptive data and the angle of the vector represents another dimension of the data, in accordance with a preferred embodiment of the invention.

Referring now to the drawings, FIG. 1 shows an important feature of the present invention in which the display of descriptive data having two dimensions is provided through the use of a vector, that is, a line having a specific length and extending in a specified direction. In FIG. 1, a vector 10 is displayed. The length of vector 10, denoted by $f_i$, is representative of the functional value of a particular item of descriptive data. Angle Θ specifies the direction of vector 10 with respect to the horizontal axis, and represents an importance weight of the data represented by vector 10. In other words, the length of vector 10 describing a particular type of information about a candidate represents "how good it is" and the direction of vector 10 represents the degree of importance that a particular observer, such as a customer, places upon the data represented by vector 10. For example, vector 10 may be used to convey information, such as acceleration, relating to a specific model of motor vehicle. The length of vector 10 represents, in a relative manner, how fast this particular model can accelerate. Such relative functional value can be represented on a scale of 0 to 5, with 5 representing extremely high acceleration.

It can be readily understood that acceleration may be very important to one particular type of motor vehicle customer, such as young performance enthusiast. On the other hand, a different customer, such as a customer desiring safe, reliable family transportation, may consider acceleration to be relatively unimportant. The relative importance can also be defined on a scale of 0 to 5, and with the resulting value being divided by 5 to obtain an importance weight w, ranging from 0.0 to 1.0. By defining Θ as the angle whose sine is equal to a customer importance $w_i$, a weighted functional score $w_i f_i$ equal to the product of the customer importance $w_i$ and the functional value $f_i$ can be obtained. As can be seen in FIG. 1, the weighted functional score constitutes the vertical component of vector 10.

Figure 2:
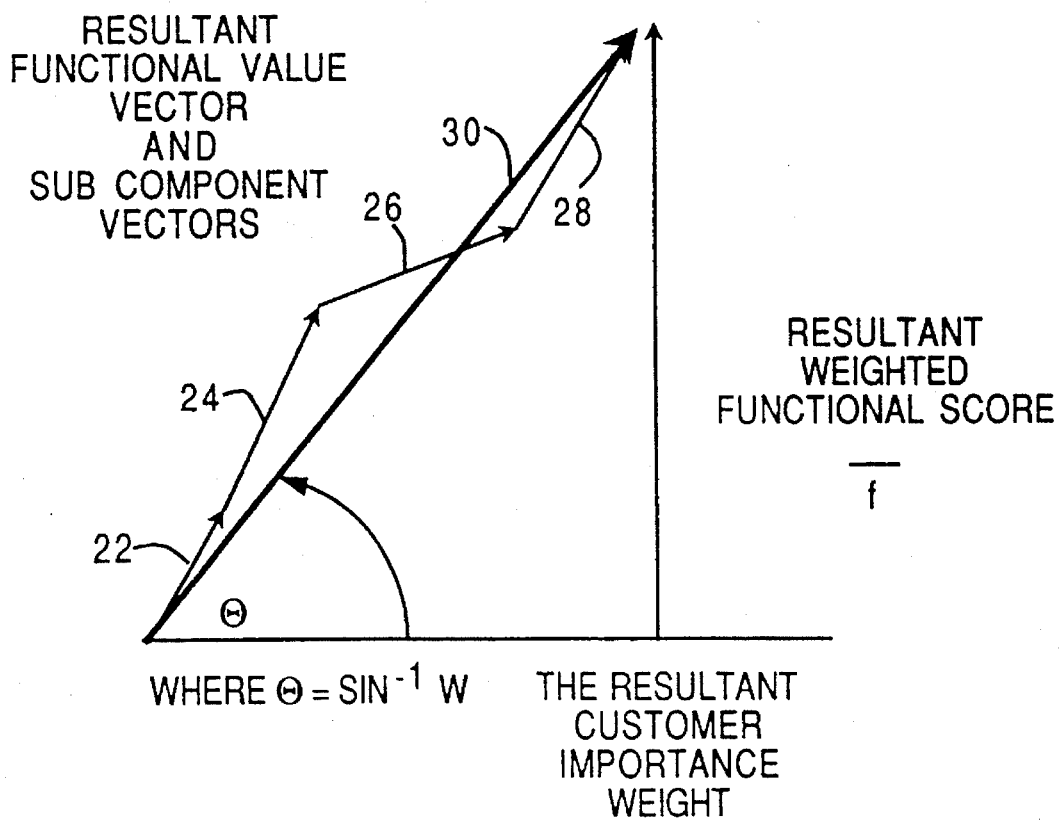
FIG. 2 shows a vector having a plurality of components each representing data.

The concept of the vector shown in FIG. 1 can be expanded to provide display of descriptive data having multiple categories. Continuing the motor vehicle example noted above, descriptive data representing a motor vehicle can be grouped into categories of descriptive data such as comfort, performance, reliability, and cost. Each of these categories of descriptive data can be represented as vectors, constituting subcomponent vectors 22, 24, 26, and 28 of a resultant vector 30, as shown in FIG. 2. For example, the length of subcomponent vector 22 can represent the relative functional value (on a scale of 0–5) of the comfort of a specific motor vehicle. The angle of vector 22 with respect to the horizontal axis represents the degree of importance which a particular customer attaches to comfort (also on a scale of 0–5, but further scaled by dividing by 5 to obtain a range of 0–0.1).

Subcomponent vector 24 is displayed extending from the tip of subcomponent vector 22, and has a length representing the relative functional value of performance of this particular model of motor vehicle. The angle of subcomponent vector 24 with respect to the horizontal axis represents the degree of importance which the particular customer attaches to performance in a motor vehicle. Similarly, subcomponent vectors 26 and 28 are each displayed extending from the tip of the preceding vector, with their length indicating the relative functional values of reliability and cost, respectively, and their angles representing the degree of importance which the particular customer attaches to reliability and cost, respectively.

In FIG. 2, the length of each of the subcomponent vectors is scaled to be equal to the functional value corresponding to the subcomponent vector, divided by the sum of the scaled importance weights for all subcomponent vectors.

Resultant vector 30 thus can be used to display descriptive data for this particular model of motor vehicle as viewed by a particular customer. The vertical component of vector 30 constitutes a resultant average weighted functional score f and represents the overall evaluation of the motor vehicle model by this particular customer.

The average weighted functional score $\bar{f}$ can be calculated from the functional value of each feature corresponding to component vectors 22, 24, 26, and 28 and the importance weights of the features corresponding to subcomponent vectors 22, 24, 26 and 28. In particular, the average weighted functional score $\bar{f}$ can be calculated by obtaining the product of the functional value of each feature and the importance weight of the corresponding feature, summing the products so obtained, and dividing the sum by the sum of the important weights of all features. Expressed mathematically:

$$\bar{f} = \frac{1}{n} \sum_i w_i f_i \tag{A}$$

where: $n = \sum_i w_i$

It can be readily appreciated that the desirabilities of two different models of motor vehicles for a particular customer, (or class of customer) can be represented by the simultaneous display of a pair of resultant vectors 30, each corresponding to a particular motor vehicle model. Similarly, the desirability of a single motor vehicle model for different types of customers can be represented by the display of various vectors as shown in FIG. 3.

In FIG. 3, a candidate consisting of a motor vehicle is described by four categories of data, such as comfort, performance, reliability, and cost. The particular motor vehicle illustrated in FIG. 3 has a group of functional values for these categories, respectively represented by the numbers 4, 3, 2, and 1. That is, the motor vehicle has relatively good comfort (4) but relatively poor cost (1), that is, a relatively high cost. This motor vehicle is evaluated by seven different criteria, such as the evaluations of different classes of customers, which each attach different relative importance to the motor vehicle data categories of comfort, performance, reliability and cost. A first class of customer, represented by vector 34, attaches equal importance to all categories. That is, comfort, performance, reliability, and cost are each very important to this particular customer. The criteria, or customer importance values, for the various dimensions can be represented by a customer profile of the four categories, which in the case of vector 34 is represented by 5555 (shown in a rectangle 35 in FIG. 3). These customer importance values are then scaled by ⅕, to obtain a profile of customer importance weights of 1111.

A second class of customer, represented by vector 36, places different importance on the categories of data describing a motor vehicle. In particular, the customer represented by vector 36 rates comfort and performance as extremely important, but reliability and cost are very unimportant. Thus, the criteria, or customer profile, for vector 36 is 5500. Other classes of customers rate the four categories of motor vehicle data with different importance represented by customer importance values of 5511, 4321, 1234, 1155, and 0055, as represented by vectors 38, 40, 42, 44, and 46.

As in FIG. 2, the length of subcomponent vectors of each vector is scaled to be equal to the functional value corresponding to the subcomponent vector, divided by the sum of the scaled importance weights for all subcomponent vectors of the corresponding vector. For example, the length of the first subcomponent vector of vector 34 is equal to the corresponding functional value (4) divided by the sum of the scaled importance weights (5/5+5/5+5/5+5/5), or 4.0. Similarly the first subcomponent of vector 40 has a length equal to (4) divided by (4/5+3/5+2/5+1/5), or 2.0.

By viewing the display of descriptive data related to seven different classes of customers considering a particular motor vehicle in the manner shown in FIG. 3, it can be appreciated that the motor vehicle in question should prove relatively desirable to the class of customer represented by vector 36. This particular customer places a high premium on comfort and performance, but is relatively uninterested in reliability and cost. Accordingly, the resultant weighted functional score, calculated according to the equation set forth above, is the highest of all seven vectors in FIG. 3. On the other hand, the same motor vehicle may prove relatively undesirable to the customer represented by vector 46. This customer is looking for economical reliable transportation, and places no value on the high performance and comfort provided by the motor vehicle in question. Thus, a decision maker viewing this data can readily determine the type of customer to which the particular motor vehicle of FIG. 4 will appeal and can use this information, for example, to plan an appropriate marketing campaign.

Figure 4:
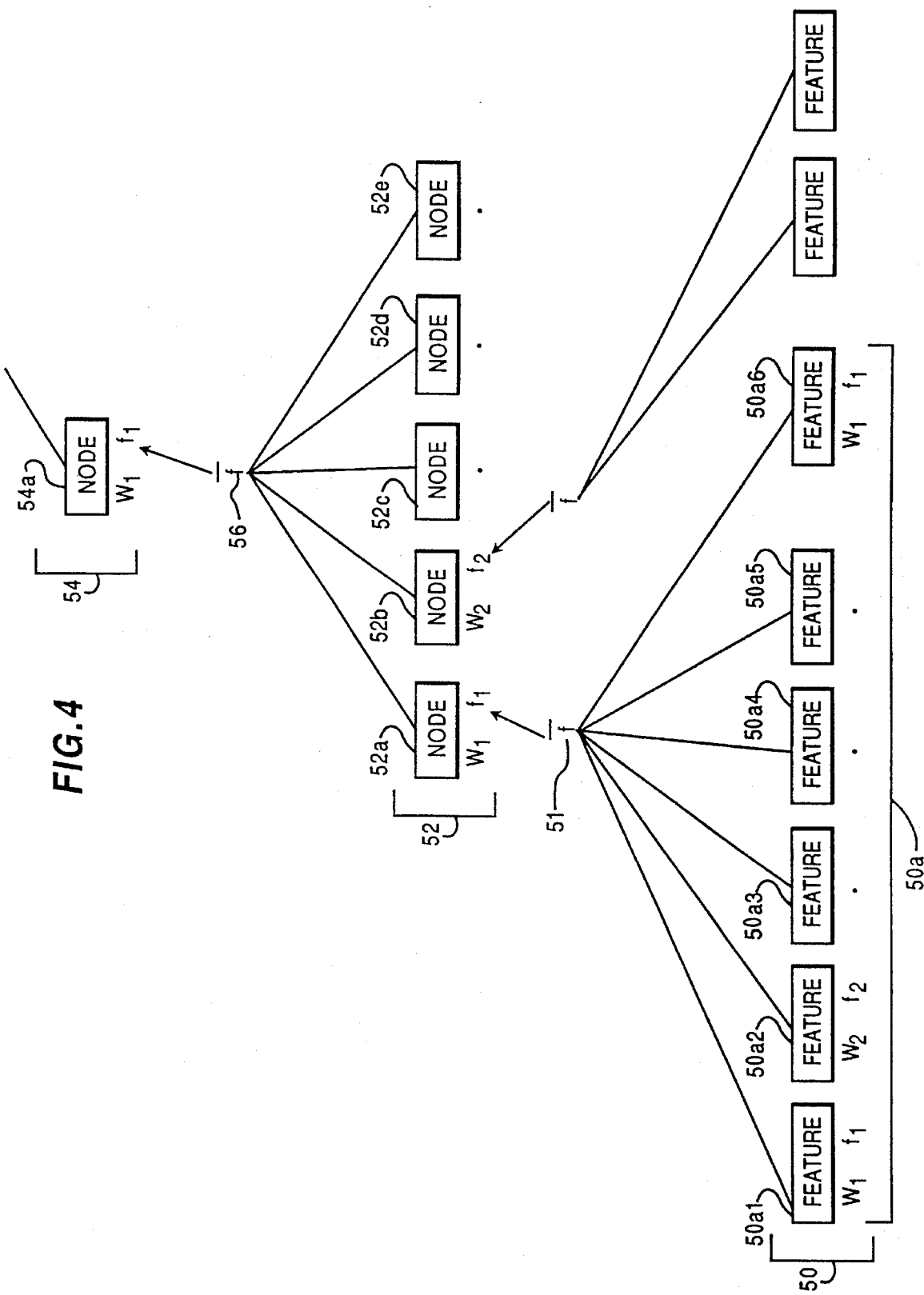
FIG. 4 shows descriptive data for a candidate arranged in a hierarchal tree.

The principles of the present invention are particularly applicable to display descriptive data for candidates in which the data can be arranged in a hierarchical "tree", as shown in FIG. 4. The "tree" of FIG. 4 includes a plurality of levels of nodes, with the bottom of the tree constituting a plurality of features. The higher level nodes of the hierarchy may correspond, for example, to broad categories, or customer requirements, of a particular product, whereas detailed features which are examples of such broad requirements occupy the bottom level of the tree. Generally, the features can be organized into intermediate categories, or levels, between the broad categories of the highest level, and the specific features of the lowest level. In FIG. 4, for example, features $50_{a1}$–$50_{a6}$ are each associated with one node 52a of a plurality of nodes in a next higher level 52. Each node 52b, 52c, 52d, 52e, etc. also has associated therewith a separate group of features, not shown in FIG. 4.

Nodes 52a–52e are in turn arranged in a group, associated with a node 54a of a group of nodes at a next higher level 54. Other nodes of level 54 are not shown in FIG. 4.

An importance weight $w_i$ and a functional value $f_i$ are assigned to each feature of level 50. The functional value $f_i$ assigned to each feature is a measure of the relative value of the feature, that is, how good the feature is for the candidate being described. The importance weight $w_i$ represents the relative importance that a particular customer attaches to the specific feature.

Although various types of functional value measures could be employed, the preferred embodiment uses a scale of 0 to 5 for each. Thus, a functional value of 0 or 1 for a particular feature of a candidate means that, in this candidate, the particular feature is not very good. On the other hand, a functional value of 5 means that the particular feature for the candidate performs very well indeed. Similarly, a customer importance of 1 for a particular feature of a candidate means that a particular class of customer does not place a great deal of importance on this feature. Correspondingly, a customer importance of 5 for a particular feature of a candidate means that this particular customer considers the feature to be very important.

In order to calculate angles for vectors, in a manner to be described below in greater detail, importance values of 0–5 are scaled by dividing by 5, thereby yielding an importance weight of 0–1.0.

As shown in FIG. 4, the importance weights and functional values are assigned to each feature of level 50. These importance weights and functional values are used to calculate an average weighted functional value $\bar{f}$ for all of the features associated with each node. This calculation is performed according to formula (A), set forth previously. That is, the product of the importance weight w and the functional value f is calculated for each feature. These products are summed, for each group of features, and the sum thereby obtained is divided by the sum of the importance weights for all features of the group. The average weighted functional score $\bar{f}$ then is assigned as the functional value $f_1$ of the node of the next higher level, associated with the features of the group. As seen in FIG. 4, the average weighted functional score $\bar{f}$ 51 of features $50_{a1}$, $50_{a2}$, $50_{a3}$, $50_{a4}$, $50_{a5}$, and $50_{a6}$ is assigned as the functional value $f_1$ of node 52a. In a similar manner, average weighted functional scores are calculated for each group of features associated with each of the nodes 52b, 52c, 52d, 52e, etc. These average weighted functional scores are then assigned as the functional value f of the corresponding node.

Importance weights are then assigned for each node. In the preferred embodiment, importance weights are determined for each node independently of the features or nodes of lower level. However, for certain applications, it may be desired to calculate importance weights from the values of importance weights of associated features or nodes of lower levels, such as by calculating an average weighted value.

In an analogous manner, an average weighted functional score $\bar{f}$ 56 is computed from the functional values of each associated node of level 52 and the assigned importance weights of the corresponding nodes, according to formula (A). In an analogous manner for each node of the next high level, an average weighted functional score $\bar{f}$ is computed using the functional values and assigned importance weights of the associated nodes of the level immediate below. The numeric data thus obtained is compiled in tabular form and displayed as vectors, in the manner shown in FIG. 2. In particular, a series of vectors is displayed, with each vector extending from the tip of a preceding vector, having a length representative of the function value of one of the highest level nodes, and an angle representative of the assigned importance weight for the respective node.

As set forth previously, an average weighted functional score of a level of descriptive data is computed using a plurality of values from a lower level of the tree. In many applications, it is important to determine how "confident" a value the average weighted functional score really is. Thus, if the average weighted functional score represents values that vary widely from the average, then the usefulness of the data may be questionable, whereas component values that very only slightly from the average weighted functional score assure more certitude. In order to display such information, the variance $\sigma^2$ of the average weighted functional score can be computed as:

$$\sigma^2 = \frac{1}{n} \sum_i w_i \cdot f_i^2 - \bar{f}^2 \qquad (B)$$

where: $n = \sum_i w_i$

σ is the statistical quantity Standard Deviation, and the smaller its value, the "tighter" is the variance between the component values which make up the average weighted functional score. As can be seen from the above formula, both the importance weight and the functional value play a role in variance.

Variance can be displayed in conjunction with a Normal Curve, as shown in FIG. 5. Normal Curves 60, 62, and 64 are shown, respectively having standard deviations of 0.4, 1.0, and 2.5. These curves demonstrate that the smaller the standard deviation, the tighter is the variance about the mean.

In a preferred embodiment of the present invention, the variance of an average weighted functional score, constituting a subcomponent vector, is represented by the thickness of the subcomponent vector. Specifically, display of a thick vector represents an average weighted functional score having a small variance, reflecting the fact that the components of the data making the average weighted functional score are very close in value. From an intuitive viewpoint, when displaying average functional scores based on functional values and customer importance weights, a small variance means that each of the component data contributing to the overall value being displayed by the vector contributes substantially equally. On the other hand, a thin vector implies that one or more of the components which make up the data being displayed by the vector may have a value significantly different than the average weighted functional score. This implies that, even if the length of the vector is fairly good, some type of weakness may be involved in the component parts making up the vector. A thin vector is an indication to a decision maker viewing the vector representation of the data that the underlying data represented by this particular thin vector should be examined more closely to determine the source of the weakness.

Figure 6:
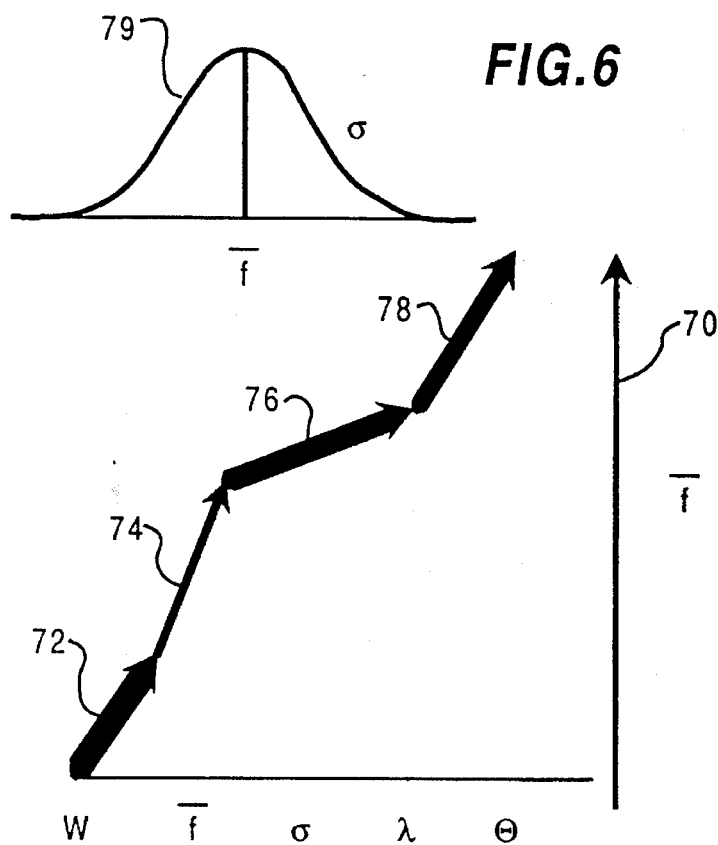
FIG. 6 is a profile summary chart showing a vector with four components of different thicknesses, and an associated Normal Curve.

An example illustrating these features of the invention is shown in FIG. 6, which constitutes a profile summary chart. As can be seen therein, descriptive data representing a candidate has an overall average weighted functional score $\bar{f}$ illustrated by the vertical component 70 of a vector formed of subcomponent vectors 72, 74, 76, and 78. The data represented by subcomponent vector 72 illustrates that although its average weighted functional score, represented by the length of subcomponent vector 72 is not impressive, each of the components of data used to calculate the average weighted functional score represented by subcomponent vector 72 is very close to the mean, as indicated by the relatively large thickness of subcomponent vector 72. With respect to subcomponent vector 78, it can be seen that the data represented thereby includes a relatively large average weighted functional score, as represented by the relatively long length of subcomponent vector 78. Moreover, the comparatively large angle with respect to the horizontal axis for vector 78 implies that customers place a relatively large importance on the category represented by subcomponent vector 78. Moreover, the relatively large thickness of a subcomponent vector 78 illustrates that these components use to calculate subcomponent vector 78 are also relatively close to the mean representing a relatively well balanced group of components.

Subcomponent vector 76 has a length approximately equal to that of subcomponent vector 78. The comparatively small angle of subcomponent vector 76, however, implies that customers do not value this category very highly. Thus, subcomponent vector 76, although having a relatively long length and indicating relatively good balance (in view of the relatively large thickness) does not make a large contribution to the overall value of the product represented in FIG. 6, since the contribution of subcomponent vector 76 to the vertical component 70 is relatively small.

Subcomponent vector 74 has a relatively long length and has a relatively large angle with respect to the horizontal axis. This implies both a high functional value and a large customer importance weight, thus making a strong contribution to the length of vertical component 70. However, subcomponent vector 74 is relatively thin. This implies that the components of data which contribute to the display of subcomponent vector 74 are not closely spaced about the mean. This in turn implies a weakness in one or more of the components of information which contribute to subcomponent vector 74, and is an indication to a decision maker to examine the underlying data of subcomponent 74 to determine the source of the weakness.

Curve 79 of FIG. 6 shows a Normal Curve based on average weighted functional score $\bar{f}$ represented by component vector 70, along with the standard deviation σ, determined by the lengths of subcomponent vectors 72, 74, 76, and 78. The shape of curve 79 provides additional information to a decision maker viewing the vectors of FIG. 5, indicating that the four components used to calculate the value of $\bar{f}$ are not unduly spread away from the mean value $\bar{f}$. Curve 79 is somewhat similar to curve 62 of FIG. 5, and thus represents neither a value composed of widely varying components such as represented by curve 64 of FIG. 5 nor a tight, sharply pointed curve 60, which represents data having components closely spaced about the mean.

A decision maker viewing FIG. 6, including subcomponent vectors 72, 74, 76, 78, as well as curve 79 could quickly interpret the significance of a large amount of data. Such significance can be more easily appreciated through such graphical representation than by a tabular display of the "raw" numeric data used to form the vectors and curve of FIG. 6.

Figure 7:
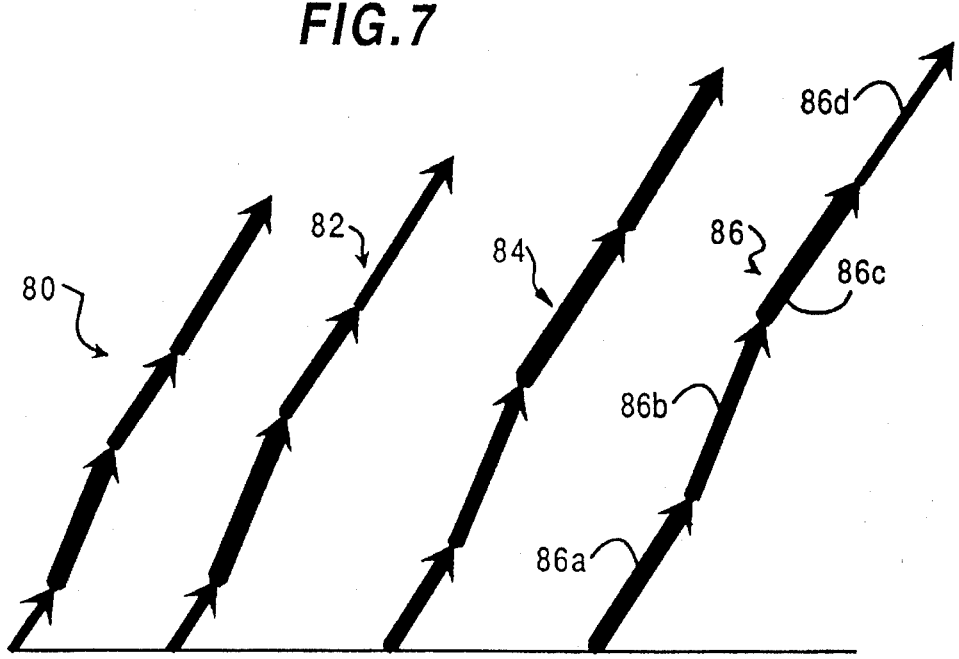
FIG. 7 shows four multiple-component vectors representing descriptive data for four candidates.

FIG. 7 shows four multiple-component vectors 80, 82, 84, and 86, respectively representing descriptive data for four candidates. This is in contrast to FIG. 3, which represented descriptive data for one candidate, as viewed by multiple customers. The vertical components of resultant vectors 80, 82, 84, and 86 provide an indication of the average weighted functional score of all data making up such vectors. It can be seen that vector 86 has the highest vertical component. Moreover, vector 86 has three strong subcomponents 86a, 86b, and 86c which have both relatively long overall length and relatively high angles with respect to the horizontal. This indicates that the data represented by subcomponents 86a, 86b, 86c is both very good and considered relatively important by a customer. Moreover, each of the subcomponent vectors 86a, 86b, and 86c is relatively thick, indicating relatively equal contributions by all components of data upon which subcomponent vectors 86a, 86b, and 86c were derived.

However, subcomponent vector 86d, while having a relatively long length and a relatively high angle, is relatively thin. This implies that one or more of the components used to derive subcomponent vector 86d is spaced away from the mean value. This in turn indicates some type of weakness in the underlying data. Similarly, vectors 80 and 82 each include one or more "weak links" in their components.

Vector 84, on the other hand, has four strong subcomponents, each having an acceptably large length and angle, as well as a large thickness. This quickly can convey an impression to a decision maker that the candidate represented by vector 84 is a strong candidate, even though its overall vertical component is not as high as that of vector 86. Thus, the present invention provides a method for displaying data in a manner which can be quickly and easily absorbed by a decision maker.

The invention will now be described in greater detail, using an example constituting a comparison between a plurality of word processing computer program candidates.

Figure 8:
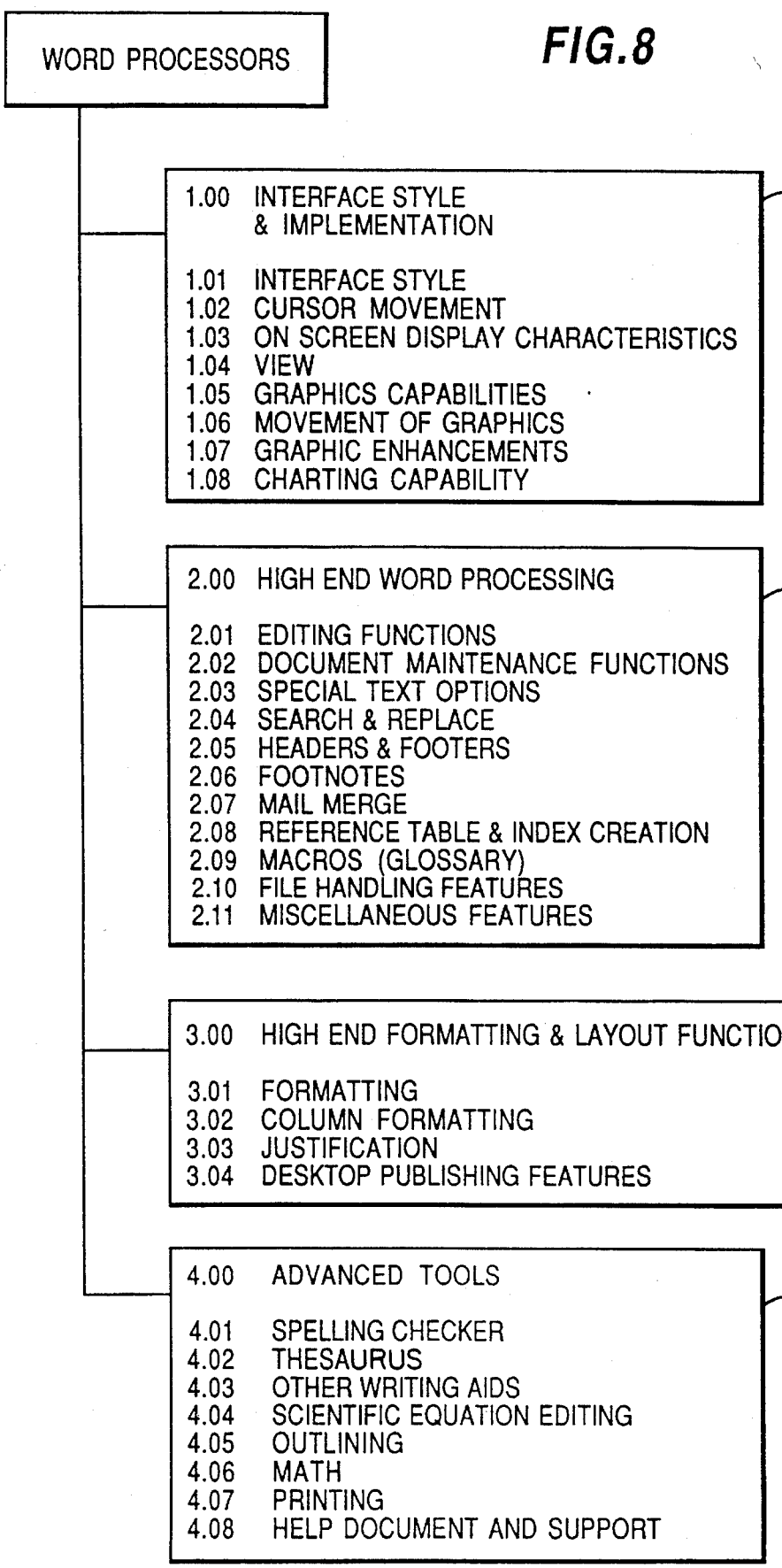
FIG. 8 shows an example of the highest level nodes of a hierarchal tree containing descriptive data for word processors.

FIG. 8 illustrates the highest level of nodes of a hierarchical tree used to analyze word processing programs. The highest level of the tree consists of nodes 90, 92, 94, and 96, respectively representing Interface Style and Implementation, High End Word Processing, High End Formatting and Layout Functions, and Advanced Tools. Each of the nodes 90, 92, 94, and 96 includes a plurality of nodes of a lower level. For example, node 94 is associated with the following lower level nodes: Formatting, Column Formatting, Justification, and Desktop Publishing Features.

FIG. 9 shows a next lower level for node 94. Specifically, node 94 is associated with four lower level nodes 100, 102, 104, and 106. Each of the nodes 100, 102, 104, and 106 is associated with a plurality of features. For example, node 104, representing a group of features denominated by Justification, is made of up the individual features Block-justified Text, Kerning, and Word or Inter-character (Micro-) Justification.

In the preferred embodiment, each candidate word processor which is to be represented by the present invention is analyzed according to the individual features constituting the lowest level of the hierarchical tree. For example, each word processor is analyzed with respect to features of node 104 to determine how well (on a scale of 0–5) the word processor can produce block-justified test, how well the word processor can provide kerning, and how well the word processor can produce word or intercharacter justification.

Each word processor is similarly analyzed to determine a functional value on a scale of 0–5 for each of the features of node 100, node 102, and node 106, all associated with node 94. Each candidate word processor is further analyzed to determine a functional value for each of the features associated with lower level nodes of nodes 90, 92, and 96 (FIG. 8).

Customer importance weights are then determined (for a particular customer or customer class) for each of the features of each of the word processors. For example, with respect to node 104 of FIG. 9, a customer importance weight is derived to determine how important (on a scale of 0–5, subsequently scaled to 0–1.0)) the customer or customer class views block-justified text, kerning, and word or inter-character justification. In a similar manner, a customer importance weight for each of the remaining features of the word processor is assigned. When all of the information identified above has been determined, calculations are initiated in which, for each feature, the product of the functional value and customer importance weight is determined. Average weighted functional scores for each of the nodes 100, 102, 104, and 106 are determined, based on the products of the functional values and customer importance weights of the associated features, as set forth in the formulas identified previously. In a similar manner, average weighted functional scores for each of the lower nodes associated with nodes 90, 92, and 96 are determined. A customer importance weight is then assigned to each of the nodes. The average weighted functional scores and customer importance weights are then calculated all the way up to the highest level nodes 90, 92, 94, and 96 of FIG. 8. The numeric data thus assembled and calculated is used to generate and display vectors, in the manner described previously.

Figure 10:
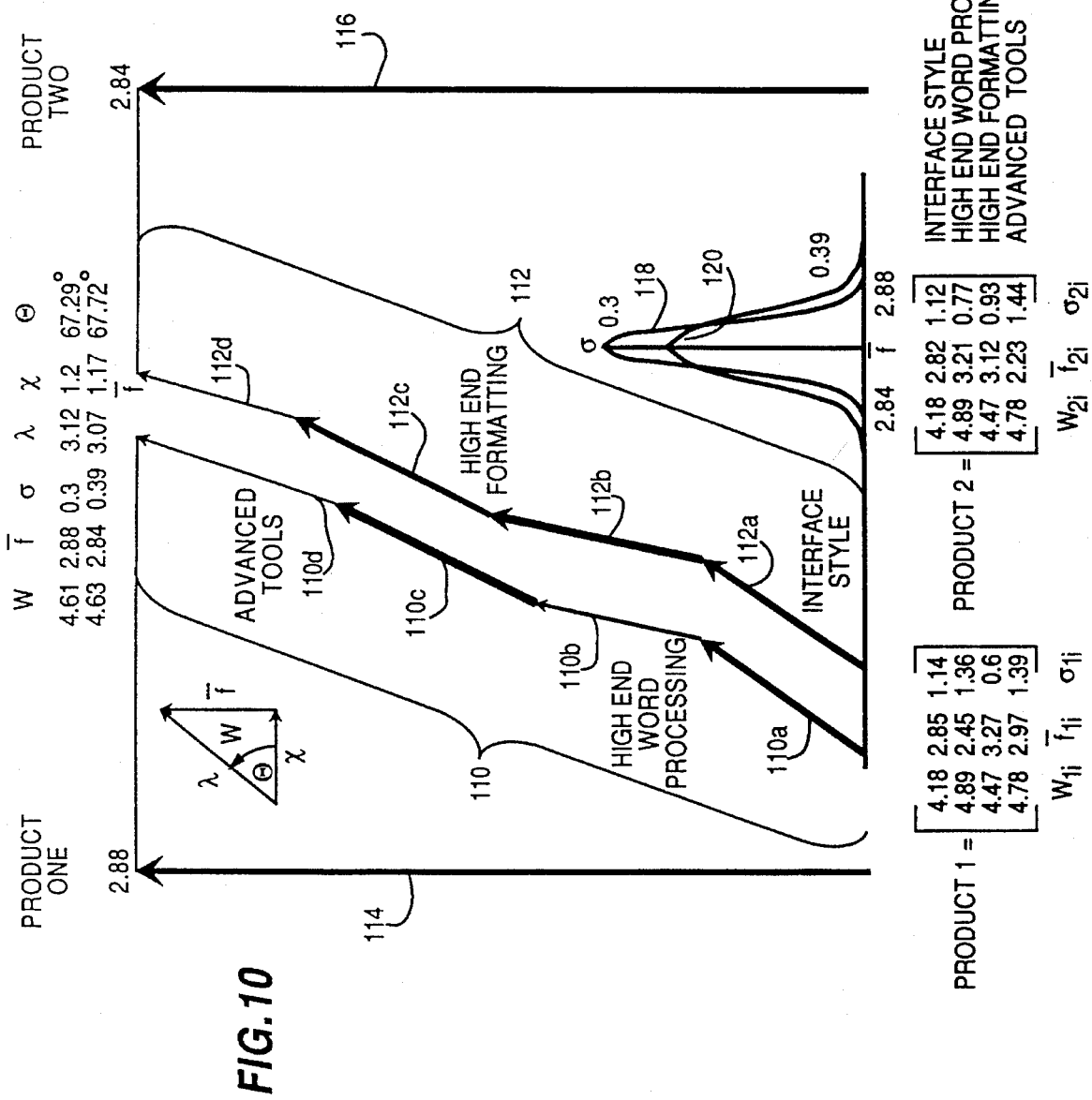
FIG. 10 shows a pair of summary profile charts for two word processor candidates analyzed according to the hierarchal tree shown in FIG. 8.

FIG. 10 illustrates a comparison of two word processor candidates using profile charts displayed according to the analysis described above. As can be seen in FIG. 10, profile charts for two products, Product One and Product Two, are displayed. The profile charts for Products One and Two respectively include resultant vectors 110 and 112, including respective vertical components 114 and 116. Vertical components 114 and 116 respectively represent the overall weighted functional scores $\bar{f}$ of Products One and Two.

As can be seen in FIG. 10, the weighted functional score of vertical component 114 of Product One has a value of 2.88 and the weighted functional score of vertical component 116 of Product Two has a value of 2.84. The overall weighted functional scores of products One and Two are thus very similar. However, viewing of the subcomponent vectors 110a–110d and 112a–112d of vectors 110 and 112 (which represent the highest level nodes directed to the broad features of Interface Style, High End Word Processing, High End Formatting, and Advanced Tools) indicates that Products One and Two would be viewed considerably differently by a customer.

Since the profile charts of FIG. 10 are prepared for the same class of customer, the angles of subcomponent vectors, representing customer importance weights, are equal. Moreover, the subcomponent vectors 110a and 112a, respectively representing Interface Style for Products One and Two have similar lengths and thicknesses. Accordingly, with respect to interface style, Products One and Two would be viewed similarly by a customer.

On the other hand, subcomponent vectors 110b and 112b, respectively representing High-End Word Processing for Products One and Two are considerably different. That is, subcomponent vector 112b has a greater length, representing a greater functional value, and is also thicker. This means that not only are the functional values of lower level nodes associated with High-End Word Processing higher for Product Two than for Product One (resulting in a longer subcomponent vector 112b), but the functional values of such associated lower level nodes are very close in value to the average weighted functional value of the High-End Word Processing node, represented by the length of vector 112b. This would be interpreted by a decision maker as an indication that the broad functional feature of High-End Word Processing has both a strong functional value and also is well balanced in all subcategories of features which make up the High-End Word Processing node.

In contrast, subcomponent vector 110b, representing High-End Word Processing for Product One, is both shorter and thinner. This would be interpreted by a decision maker as an indication that not only is Product One less capable in the area of high-end word processing, but the factors which make up the category of High-end Word Processing have more widely varying functional scores, away from the average weighted functional score of the entire node. Thus, it is likely that Product One is deficient in some aspect of high-end word processing.

Another observation likely to be made by a decision maker viewing the profile charts of FIG. 10 is that although Products One and Two have similar functional values for High-End Formatting, as indicated by the generally similar lengths of subcomponent vectors 110c and 112c, the thinner vector 112c indicates a probability that one or more factors represented by lower level nodes associated with high-end formatting is deficient. That is, Product Two is less balanced, with respect to high-end formatting, than Product One.

The profile charts of Products One and Two also include Normal Curves 118 and 120, respectively, for Products One and Two. Curve 118 is sharper and more pointed than curve 120, representing the fact that the functional values of the four high level nodes (i.e., the lengths of subcomponent vectors 110a–d and 112a–d representing Interface Style, High-End Word Processing, High-End Formatting, and Advanced Tools) which constitute the highest level of nodes of the word processing comparison, are more closely clustered about the average weighted functional score $\bar{f}$ of the overall Product One than are the corresponding values of Product Two. This can be seen by the sharper, more pointed nature of curve 118, in comparison with the broader curve 120.

FIG. 10 also includes tables of numeric data with which the profile charts were generated. Such numeric data, while not essential in the practice of the present invention, can result in more complete information made more readily available to a viewer. That is, a viewer can quickly determine overall impressions of data based on vectors and subcomponent vectors of the profile charts of FIG. 10, along with normal curves 118 and 120. When certain aspects of the graphical display of FIG. 10 catch the attention of the viewer, the viewer can refer to supporting numeric data to more precisely determine the nature of the information conveyed by the graphs.

Displays as set forth in FIG. 10 are particularly effective when presented in color. For example, corresponding subcomponent vectors of vectors 110 and 112 are displayed in the same color. That is, subcomponent vector 110a is the same color as subcomponent vector 112a, subcomponent vector 110b is the same color as subcomponent vector 112b, subcomponent vector 110c is the same color as subcomponent vector 112c, and subcomponent vector 110d is the same color as subcomponent vector 112d. Corresponding numeric data is also displayed in the same color. For example, the numbers 2.85 and 2.82 of FIG. 10, respectively representing the values of $f_i$ for subcomponent vectors 110a and 112a, are displayed in the same color.

Figure 11:
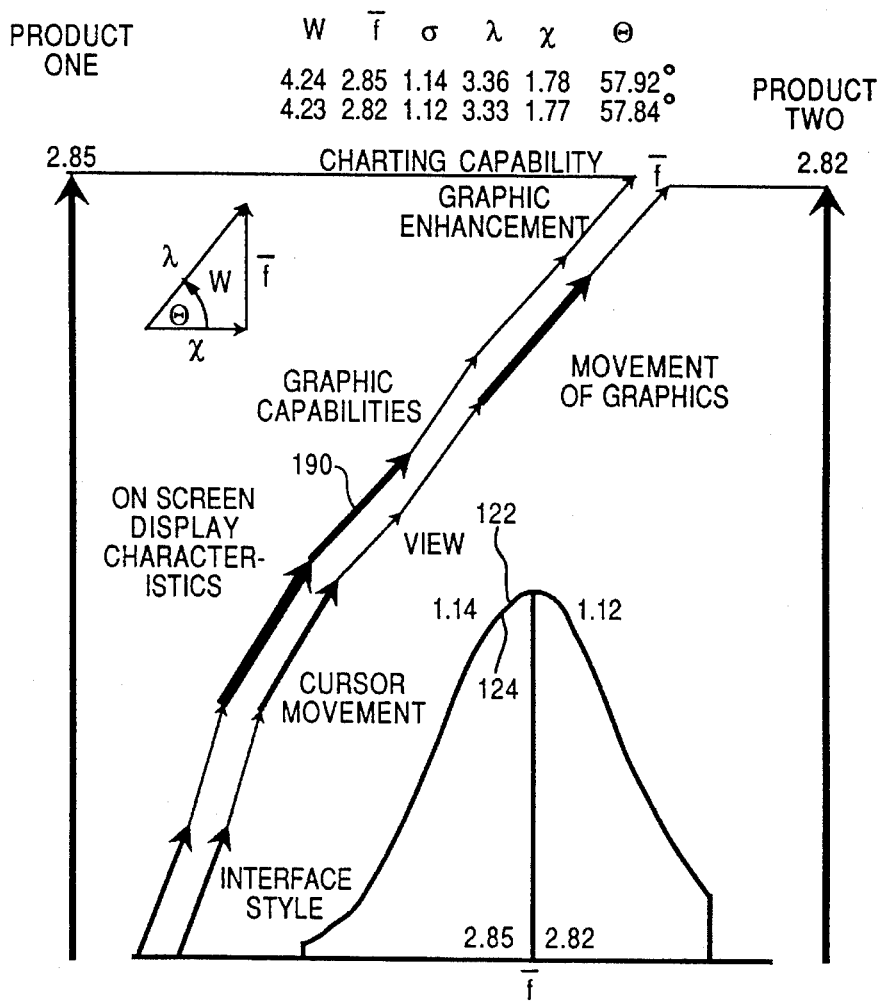
FIG. 11 shows a pair of summary profile charts of one of the component vectors of FIG. 10.

FIG. 11 is a view similar to FIG. 10, but reflecting descriptive and comparative data for a level of nodes immediately below the highest level of nodes of the word processing hierarchical tree. Specifically, FIG. 11 provides a display of data for lower level nodes associated with the Interface Style and Implementation node 90 of FIG. 8. Again, the overall weighted functional score for interface style of the two products is very similar: 2.85 for Product One and 2.82 for Product Two. Moreover, a comparison of the standard curves 122 and 124 shows that the standard deviations of the weighted functional score for Products One and Two are very similar. However, viewing of the subcomponent vectors which make up the overall functional value vector of Products One and Two, in the manner discussed above with respect to FIG. 10, illustrates that Products One and Two have quite different characteristics with respect to interface style.

For example, one factor of interest which is apparent from viewing the profile charts of FIG. 11 is that subcomponent vectors 190 and 192, representing the View subcategory for Products One and Two, respectively, have significantly different lengths and thicknesses. This indicates that this subcategory is both stronger and more balanced for Product One. A decision maker may thus want to determine the reasons for this by more closely analyzing the underlying data for this subcategory.

It can be appreciated that the possibility of a weakness in the View subcategory for Product Two is much more readily apparent from the display of FIG. 11, produced according to a preferred embodiment of the present invention, than from a table of numeric data. Moreover, this possibility may be easily noted even by a decision maker with little skill or experience in interpreting numeric data.

The present invention thus enables an inexperienced or lay person to identify with various shapes, lengths, colors and angles of vectors and use visual comparative observation to judge the superiority of one candidate over another. In addition, the vectors provide a convenient "navigational" path with which to pursue further details down through a complex hierarchy of descriptive data. For example if an observer noted a vector that was suspect, the next move would be to examine its subset vectors.

In one aspect, the invention provides a method for displaying descriptive data relating to a candidate having a plurality of groups of features. Such data may correspond to the motor vehicle example given above, in which data is organized into categories such as performance, comfort, and costs. These categories may respectively include features such as acceleration, power, and braking; shoulder room, ride, and road noise; and initial costs, maintenance costs, and resale value. Such data thus corresponds to levels 50 and 52 of FIG. 4, with level 52 constituting the highest level. Each group of features 50a is associated with a corresponding node 52a.

Figure 12:
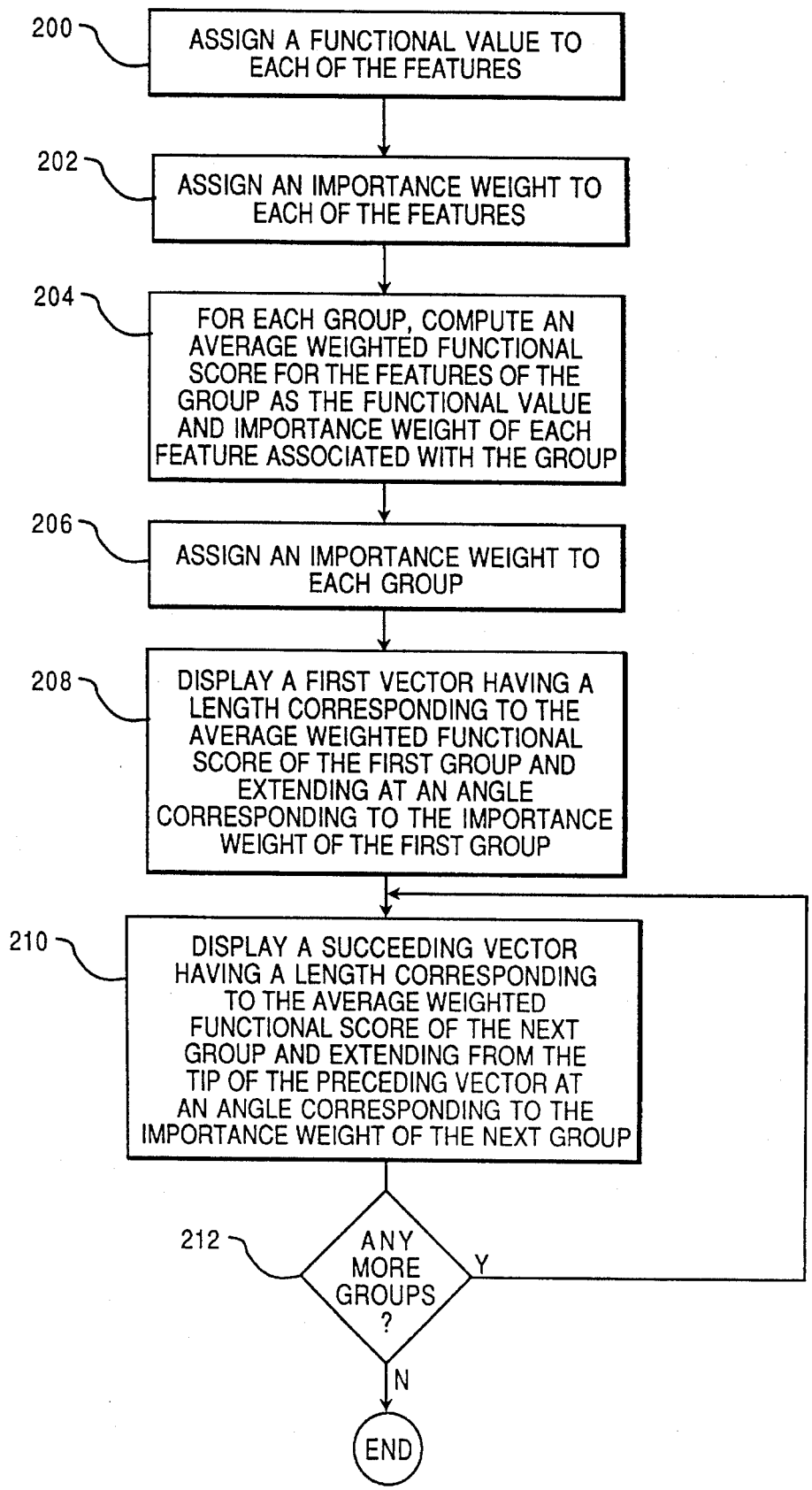
FIG. 12 is a logic flow chart of the method which constitutes a preferred embodiment of the present invention.

The method is illustrated in FIG. 12. First, in step 200, a functional value is assigned to each of the features. Although any convenient system can be used, the preferred embodiment employs a functional value scale ranging from 0–5, with 5 representing the highest function. For example, if the acceleration of the motor vehicle for which data is to be displayed is excellent, a value of 5 is assigned to the "acceleration" feature.

At step 202, an importance weight is assigned to each of the features. These importance weights are determined according to a specific standard. For example, in order to compare data relating to motor vehicles, a particular customer or class of customers is polled to assign importance weights to each of the features.

At step 204, an average weighted functional score is computed for the features of each group, using the functional value and importance weight of each feature associated with the group.

At step 206, an importance weight is assigned to each group. That is, in addition to the importance weights assigned to the features of the group, a separate importance weight is individually assigned to the group as a whole. For example, an importance weight is assigned to the group "comfort", independently of the importance weights assigned to the individual features of the group, such as front shoulder room, ride, etc.

At step 208 a first vector is displayed, having a length corresponding to the average weighted functional score of the first group and extending at an angle corresponding to the importance weight of that first group. An example of the first vector of step 208 is the vector 72 of FIG. 5.

Next, at step 210, a succeeding vector is displayed, having a length corresponding to the average weighted functional score of the next group and extending from the tip of the preceding vector at an angle corresponding to the importance weight of the next group. An example of such succeeding vector is vector 74 FIG. 5. At step 212, a determination is made if there are any more groups for which vectors must be displayed. If so, step 210 is repeated for each remaining group. As can be seen in FIG. 5, vectors 76 and 78 are displayed, each extending from the tip of the preceding vector.

The iterations of steps 210 and 212 end after display of the vector corresponding to the last group.

By use of the method shown in FIG. 12, valuable insight can be obtained into the data describing the motor vehicle, in which various features are each objectively described according to functional values and importance weights according to a predetermined criteria. Such information can be more readily appreciated and absorbed by a decision maker than when the same data is presented in tabular form.

As set forth above, the method of FIG. 12 preferably comprises the additional step of calculating a variance of the average weighted functional scores corresponding to the vectors and displaying the corresponding vectors with a thickness corresponding to the calculated variance. Thus, it can be seen in FIG. 6 that vector 72 has a relatively small variance, as indicated by its relative thickness, whereas vector 74 has a relatively large variance indicated by its thinner display.

Preferably, the average weighted functional score for the features of each group in the method of FIG. 12 is calculated by obtaining the product of the functional values of each feature and the importance weight of the corresponding feature, summing the products so obtained, and dividing the sum by the sum of the importance weights of all features of the group. This is expressed mathematically by formula (A), previously set forth.

In the method of FIG. 12, the results of which are shown in FIG. 6, the vertical component 70 of the resultant vector formed by vector component 72–78 constitutes a resultant weighted functional score $\bar{f}$. In the preferred embodiment, a normal curve 79 is displayed having a variance equal to the variance of $\bar{f}$. In the preferred embodiment, the variance is calculated according to formula (B), previously set forth.

Figure 13A:
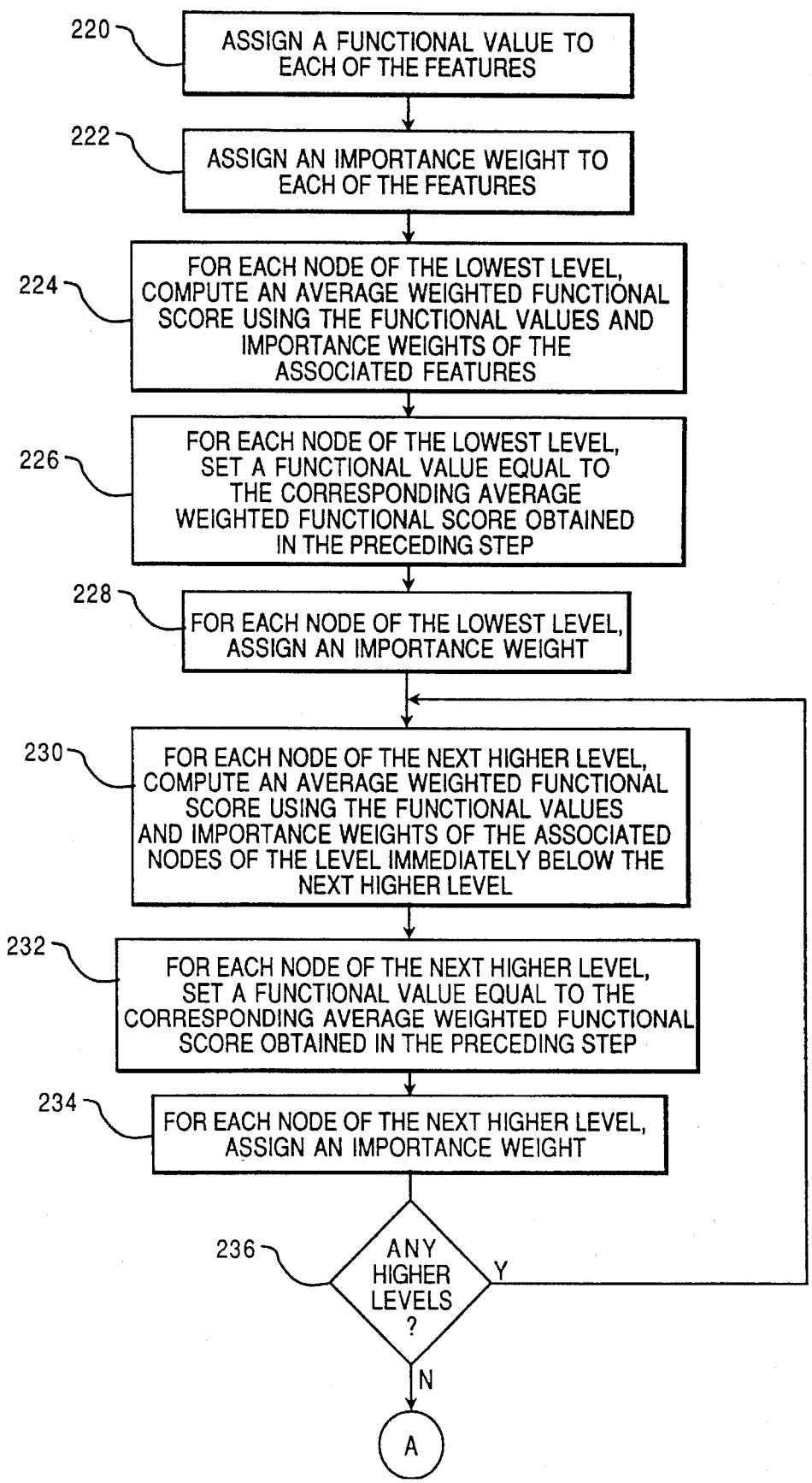
FIGS. 13A and 13B is a logic flow chart of another preferred embodiment of the present invention.
Figure 13B:
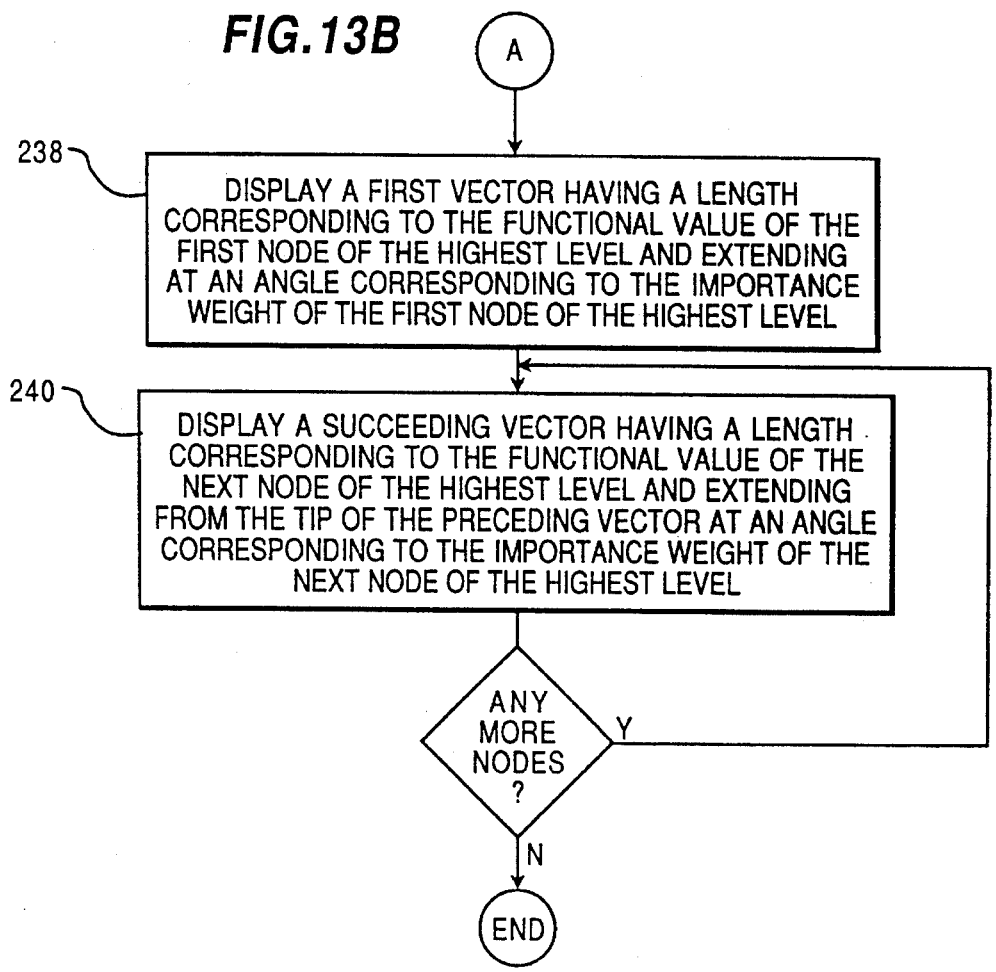

The invention, in another aspect, constitutes a method for displaying comparative data relating to a candidate having a plurality of hierarchial descriptive levels, with each of the levels including a plurality of nodes, and each of the nodes (except the nodes of the lowest level) being associated with nodes of a next lower level. The nodes of the lowest level are each associated with a plurality of features. After generating the hierarchial tree for arranging the data (such as shown in FIG. 4) the method of FIG. 13 is performed. At step 220, a functional value is assigned to each of the features in level 50. As discussed previously, any convenient system of functional values may be employed. However, the preferred embodiment employs a scale of 0–5.

At step 222, an importance weight is assigned to each of the features of level 50. This importance weight, in the preferred embodiment, is also assigned to be of value between 0 and 5 and scaled to 0–1.0, although any other convenient and consistent system could also be used.

At step 224, an average weighted functional score is computed for each node of the lowest level of nodes, using the functional values and importance weights of the features associated with each node. As seen in FIG. 4, an average weighted functional score $\bar{f}$, indicated at 51, is computed for node 52a using the functional values and importance weights of features $50_{a1}$–$50_{a6}$.

Next, at step 226, a functional value for each node of the lowest level of nodes is set equal to the corresponding average weighted functional score. As seen in FIG. 4, a functional value $f_1$ is set equal to the average weighted functional score 51 of the features $50_{a1}$–$50_{a6}$. In a similar manner, functional values $f_2$, $f_3$, etc. for each of the nodes of level 52 are set equal to the corresponding average weighted functional scores of the associated features. At step 228, an importance weight is assigned to each node of the lowest level of nodes. Thus, in FIG. 4, an importance weight is assigned to each node of level 52. These importance weights are assigned according to the same system used in step 222.

In step 230, an average weighted functional score is computed for each node of the next higher level. As shown in FIG. 4, an average weighted functional score is calculated for each node of level 54. The average weighted functional scores of step 230 are calculated using the functional values and importance weights of the associated nodes of the level immediately below. As shown in FIG. 4, an average weighted functional score $\bar{f}$ indicated by 56, is calculated, using the functional values and importance weights of nodes of level 52. Similar average weighted functional scores are calculated for each node of level 54, using the functional values and importance weights of the respective associated nodes from level 52.

At step 232, a functional value for each node of level 54 is set equal to the corresponding average weighted functional score obtained from the associated of the next lower level. As indicated in FIG. 4, a functional value $f_1$ of node 54a is set equal to average weighted functional score 56. In a similar manner, a functional value for each node of level 54 is set equal to the corresponding average weighted functional score obtained from the associated nodes of level 52.

At step 234, an importance weight is assigned to each node of the next higher level. In FIG. 4, an importance weight $w_1$ is assigned to each node of level 54. At step 236, a determination is made if there are any higher levels. If so, steps 230, 232, and 234 are repeated for each of the higher levels.

If there are no higher levels, such as in the case of the data of FIG. 4, a first vector is displayed in step 238. This vector has a length corresponding to the functional value of the first node of the highest level and extends at an angle corresponding to the importance weight of the first node of the highest level. Using the data of FIG. 4, a first vector is displayed having a length corresponding to functional value $f_1$ of node 54a. The first vector extends at an angle corresponding to importance weight $w_1$ of node 54a. In the preferred embodiment, the angle is specified as the angle whose sine is the importance weight $w_1$, and the length is equal to the functional value $f_1$ of node 54a divided by the sum of the importance weights of the nodes of the highest level.

In step 240, a succeeding vector is displayed having a length corresponding to the functional value of the next node of the highest level and extending from the tip of the preceding vector at an angle corresponding to the importance weight of the next node of the highest level. In the preferred embodiment, the angle is specified as the angle whose sine is the importance weight $w_1$, and the length is equal to the functional value of the next node divided by the sum of the importance weights of the nodes of the highest level.

A determination is then made at step 242 if any more nodes exist at the highest level. If so, step 240 is executed to display a vector corresponding to each remaining node of the highest level. The method is completed after display of a vector corresponding to the last node of the highest level.

Figure 14:
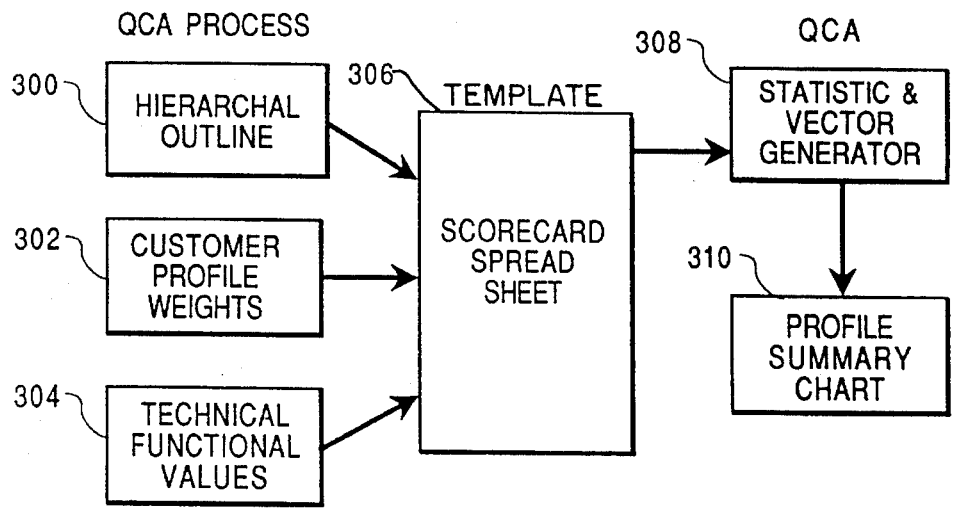
FIG. 14 shows a process for executing the preferred embodiments of the present invention.

FIG. 14 illustrates a preferred process for implementing the present invention. A higher hierarchical outline 300 is prepared, organizing the data into features and nodes, similar to FIG. 4. A customer profile 302, consisting of a set of importance weights, is generated for the features and nodes. Also, a set of functional values 304 is generated for the features. The information of 300, 302, and 304 is supplied to a processing program such as a spreadsheet. The spreadsheet is programmed to reflect the associations between features and nodes of higher hierarchical outline 300 and to perform the calculations for average weighted functional scores, variances, and angles, as set forth above. Values for importance weights and functional values are then stored in appropriate locations in the spreadsheet 306 and the spreadsheet is executed to generate a set of numeric data. Data from spreadsheet 306 is supplied to a graphics program including a statistics and vector generator 308 to display standard curves and vectors to generate profile summary charts as set forth above.

A large volume of numeric and graphic data is thus generated. Since not all this information may be desired to be displayed and provided as output at the same time, the output of statistic and vector generator 308 may be supplied to a profile summary chart editor 310 to permit an operator to select those portions and levels of the data generated to be provided as actual display and output.

Many types of spreadsheets and graphics packages could, of course, be used. In the present preferred embodiment, a higher hierarchical outline 300 is generated by preparing an outline using an outline processor constituting a standard feature of the Full Write word processing program commercially available from Ashton-Tate. Each feature and node is entered into the Full Write program, using standard outline notations, such as indicated in FIGS. 8 and 9. The resultant outline is then converted to an ASCII file, again using a standard feature of the Full Write program. The ASCII file is then provided as input to a Full Impact spreadsheet program also commercially available from Ashton-Tate. Using standard features of the Full Impact spreadsheet program, linkages and pointers between the features and nodes of the higher hierarchical outline 300 are produced. Appropriate formulas are then entered into cells of the spreadsheet to generate a spreadsheet template. Importance weights and functional values are then entered into appropriate cells of the spreadsheet template and the spreadsheet executed to generate a complete set of tables of numeric data, consisting of importance weights, functional values, weighted functional values, and angles.

The table of numeric data produced by execution of the Full Impact spreadsheet template is then supplied to the statistic and vector generator 308. In the preferred embodiment, statistic and vector generator 308 constitutes a statistical and vector calculation spreadsheet coupled with a set of macro instructions generated using standard macro capabilities of the Full Impact spreadsheet. Generation of appropriate macro instructions to calculate Normal Curves from the variance and standard deviations, and vector coordinates to comply with the rules of vector addition so as to provide the display of the desired Normal Curves and vectors, as set forth in previous sections is a standard exercise of ordinary skill in the programming art. Accordingly, further description of this process will not be provided.

Figure 15:
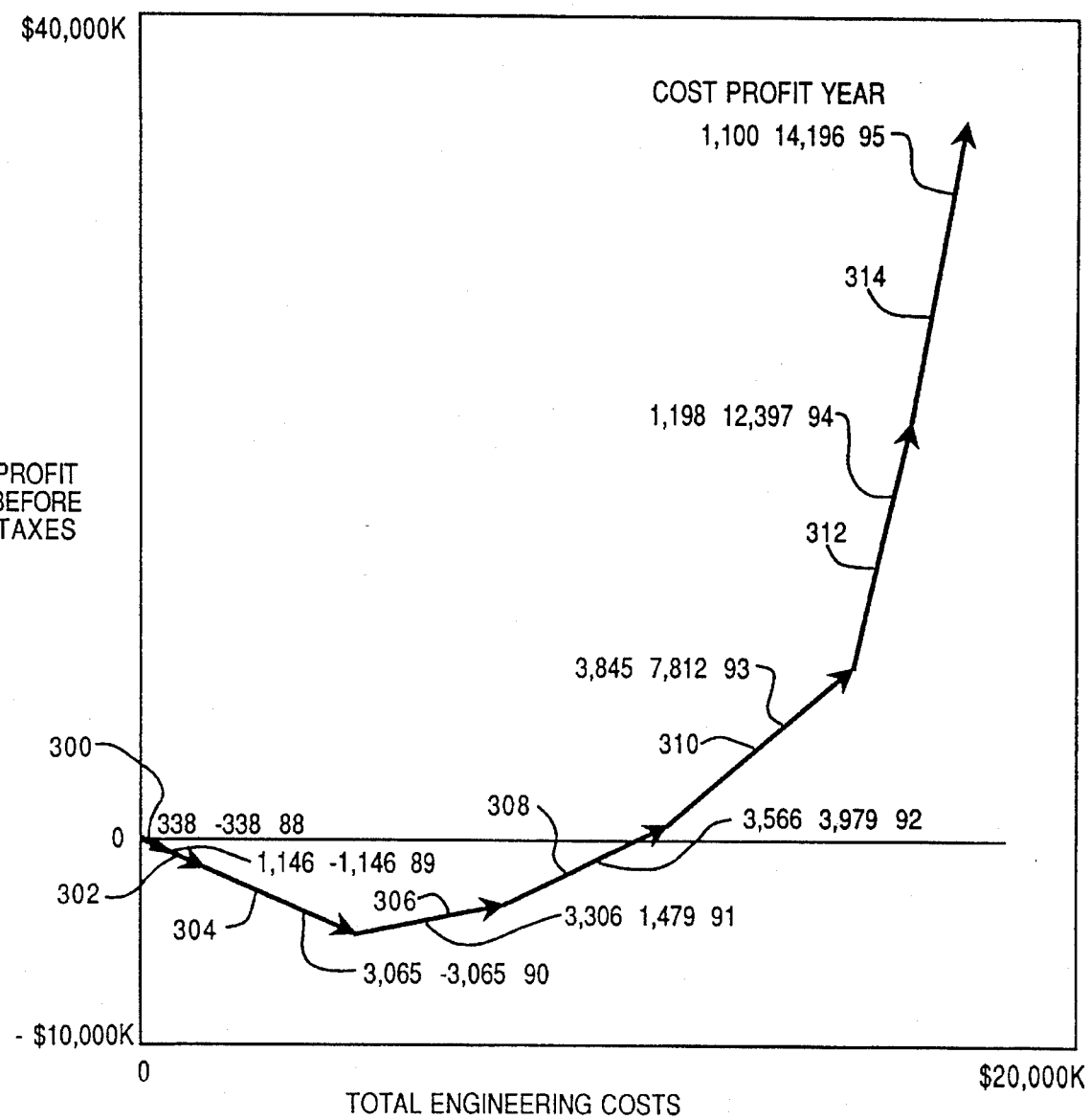
FIG. 15 shows data displayed according to another preferred embodiment of the present invention.

In another aspect, the invention provides a method for displaying data comprising a plurality of data sets, with each of the sets having a plurality of values. An example of data displayed according to this method is shown in FIG. 15. FIG. 15 provides a display of actual and projected costs and profit data for a particular product, for the years 1988 through 1995, using a plurality of vectors, with each vector extending from the tip of the preceding vector.

Figure 16:
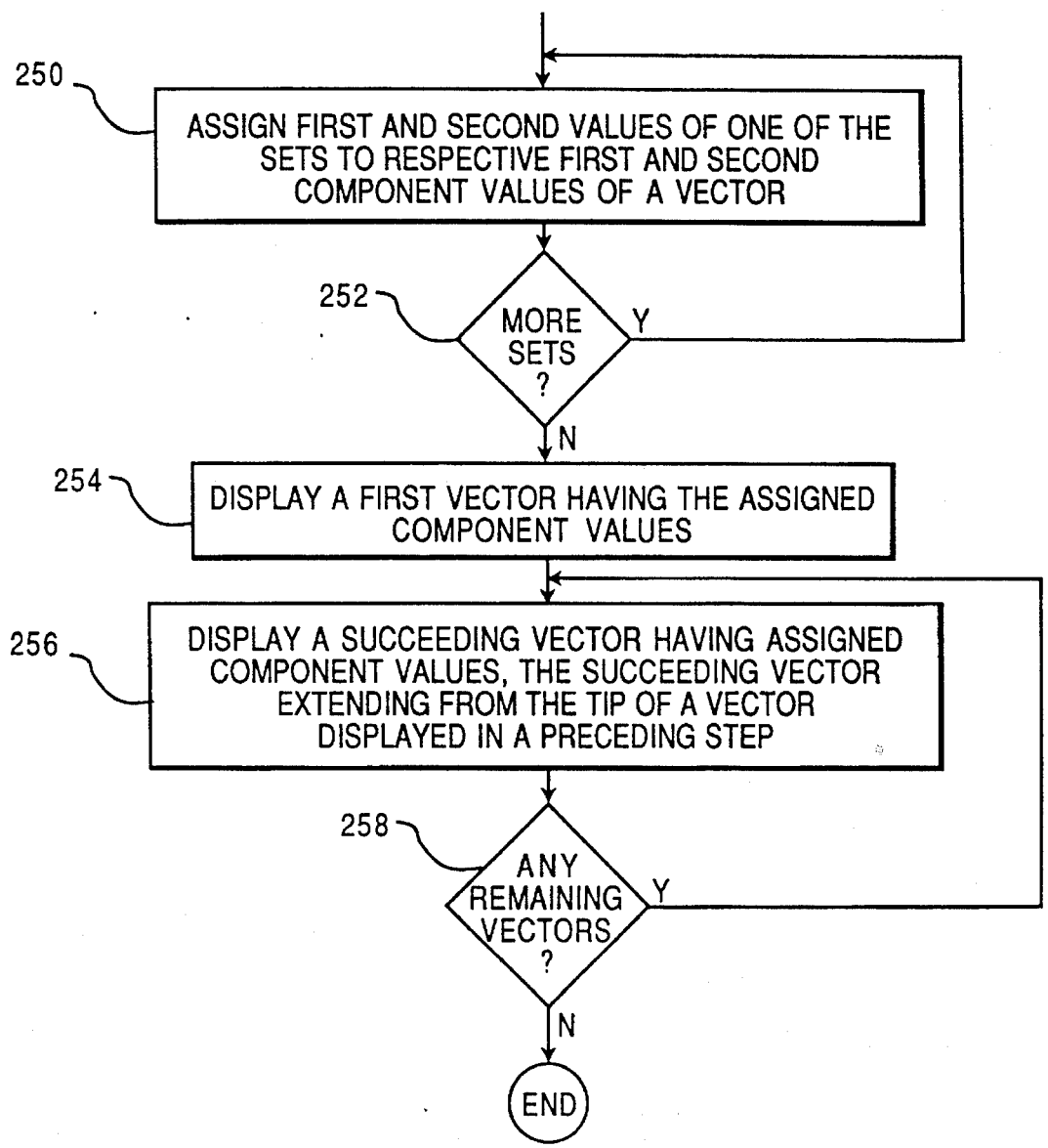
FIG. 16 is a logic flow chart of another preferred embodiment of the present invention.

A method for displaying the data of FIG. 15 is set forth in FIG. 16. The first step 250 consists of assigning first and second values of one of the data sets to respective first and second components values of a vector. In the example illustrated in FIG. 15, each data set represents costs and profit data of a different year. A first component of each vector, specifically, the horizontal component, represents costs expended in a given year. The vertical component of the same vector represents profit for the corresponding year.

Next, as shown in step 252, a determination is made if any data sets remain to be assigned. If so, step 250 is repeated for each of the remaining data sets.

Step 254 calls for displaying a first vector having component values assigned in step 250. As can be seen in FIG. 23, a first vector 300 is displayed beginning at the origin of the graph of FIG. 15. The horizontal component of vector 300 is 338. This represents a costs of $338,000 expended in the year 1988. Since no revenue was derived for this particular product in 1988, the vertical component of vector 300, representing profit for a given year is −338, representing a loss before taxes of $338,000 in the year 1988.

Next, as indicated at step 256, a succeeding vector, having component values assigned as in step 250, is displayed to extend from the tip of a vector displayed in the proceeding steps. As can be seen in FIG. 15, vector 302 extends in a horizontal direction an distance corresponding to $1,146. This represents a cost expended in the year 1989 of $1,146,000. Since no revenue is derived for this product in 1989, the vertical component of vector 302 is −1,146 representing a loss before taxes of $1,146,000 in 1989.

If there are any remaining vectors, as determined at step 258, step 254 is repeated for each remaining vector. As can be seen in FIG. 3, vectors 304, 306, 308, 310, 312, and 314 are displayed, respectively representing the years 1990–1995. Vector 304 has a horizontal component of 3,065 and a vertical of −3,065, representing a cost of $3,065,000 expended in 1990. Since no revenue was received in 1990, vector 304 indicates a loss before taxes of $3,065,000.

However, beginning in 1991, revenue was derived for this product. In particular, in 1991 a cost of $3,306,000 was expended and a profit before taxes of $1,479,000 was realized. Remaining vectors 306, 308, 310, 312 and 314 are also plotted, according to corresponding costs and profit figures.

Use of the method shown in FIG. 16 to produce a display such as FIG. 15 permits ready understanding of the costs and profit picture over the development cycle of a product. The degree of profit acceleration over the life of the product can be much more easily appreciated through a graphic display by the method of FIG. 16 then by reference to a set of tables providing the same information.

Data having dimensions other than costs and revenue can, of course, be displayed according to the method of FIG. 16. For example:

| | |
|---|---|
| Productivity: | # of units produced vs. # of hours of labor; |
| Quality of education: | # of college acceptances vs. non-acceptances |
| Personnel review: | personnel evaluation score vs. degree of importance of each subset as defined by job classification description; |

It will be apparent to those skilled in the art that the methods of the present invention can be carried out either manually or through the use of a variety of computer hardware and software. In the preferred embodiment, methods of the present invention are executed through the use of Full Write word processing software and Full Impact spreadsheet software, both commercially available from the Ashton-Tate Corporation. In the preferred embodiment, this software is executed on an Apple Macintosh II computer employing a 68020 processor and 8 Megs of RAM memory. Data is preferable inputted through a keyboard of the Macintosh computer and is displayed for output on a cathode ray tube monitor, such as a 13" Apple color monitor. Preferably, apparatus for executing the methods of the present invention also includes a color hard copy output device, such as a Digital LJ-250 printer.

Figure 17:
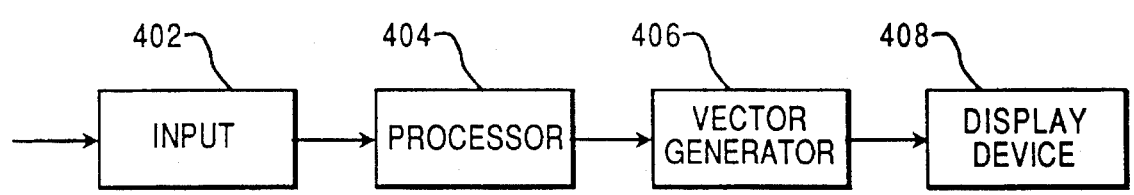
FIG. 17 is a block diagram of a system constituting a preferred embodiment of another aspect of the invention.

Thus, in another aspect, the invention provides a system for displaying descriptive data relating to a candidate having a plurality of hierarchial descriptive levels, each of the levels including a plurality of nodes, each of the nodes (except the nodes of the lowest level) being associated with nodes of a next lower level, and the nodes of the lowest level each being associated with a plurality of features. As seen in FIG. 17, a system 400 includes an input device, such as a keyboard 402, for receiving functional values assigned to each of the features, importance weights assigned to each of the features, and importance weights assigned to each of the nodes. System 402 further includes a processor 404, such as a Macintosh computer for, for each node of the lowest level, computing an average weighted functional score using the functional values and importance weights of the associated features; for each node of the lowest level, setting a functional value equal to the corresponding average weighted functional score obtained in the preceding step; for each node of the next higher level, computing an average weighted functional score using the functional values and importance weights of the associated nodes of the level immediately below the next higher level; for each node of the next higher level, setting a functional value equal to the corresponding average weighted functional score obtained; and repeating the process for each succeeding higher level. Essentially, processor 404 performs steps 224, 226, 230, and 232 of FIG. 13.

System 400 also includes a vector generator 406 for computing vector lengths and angles as set forth in steps 238 and 240 of FIG. 13. Preferably, the functions of vector generator may also be performed by a Macintosh computer executing the software described previously.

System 400 also includes a display device for displaying a first vector having a length corresponding to the functional value of the first node of the highest level and extending at an angle corresponding to the importance weight of the first node of the highest level and for displaying succeeding vectors having a length corresponding to the functional value of the next node of the highest level and extending from the tip of the preceding vector component at an angle corresponding to the importance weight of the next node of the highest level for each remaining node of the highest level. Display device 408 may be an Apple color monitor or a Digital LJ-250 printer.

It can be seen that the present invention provides a method for displaying data in a manner which can be more readily understood and appreciated by decision makers. Even a decision maker with limited aptitude for mathematics and numeric data can view the graphic displays provided by the methods of the present invention to appreciate the strengths and weaknesses of the candidates represented by the data. Accordingly, the methods of the present invention provide an improved tool for decision makers in many fields.

It will be apparent to those skilled in the art of the various modifications and durations can be made in the methods for displaying data of this invention, without departing from the spirit or scope of the present invention. The present invention covers such modifications and variations which are within the scope of the appended claims and their equivalents.

I claim:

1. A method for displaying descriptive data on an output device of a data processing system, the descriptive data relating to a candidate, the candidate having a plurality of groups of features, the method comprising the steps of:

(1) assigning a functional value to each of the features of the candidate;

(2) assigning an importance weight to each of the features of the candidate;

(3) for each group, computing in the data processing system an average weighted functional score for the features of the group using the functional value and importance weight of each feature associated with the group;

(4) assigning an importance weight to each group;

(5) displaying on the output device of the data processing system a first line having a length corresponding to the average weighted functional score of a first group and the line displaced at an angle corresponding to the importance weight of the first group;

(6) displaying on the output device of the data processing system a succeeding line having a length corresponding to the average weighted functional score of the next group and extending from a tip of the preceding line at an angle corresponding to the importance weight of the next group; and (7) repeating the preceding step for each remaining group.

2. A method as recited in claim 1 wherein each angle is equal to the angle whose sine is the importance weight of the corresponding group.

3. A method as recited in claim 2, wherein:

the step of displaying on the output device a first line having a length corresponding to the functional value of the first node of the highest level comprises displaying on the output device the first line with a length equal to the functional value of the first node of the highest level divided by the sum of the importance weights of all associated nodes of the level immediately below the highest level; and the step of displaying on the output device a succeeding line having a length corresponding to the functional value of the next node of the highest level comprises displaying the succeeding line with a length equal to the functional value of the next node of the highest level divided by the sum of the importance weights of all associated nodes of the level immediately below the highest level.

4. A method as recited in claim 1 comprising the additional step of calculating in the data processing system a variance of the average weighted functional score corresponding to one of the lines and wherein the step of displaying on the output device the one corresponding line comprises the substep of displaying on the output device the one corresponding line with a thickness corresponding to the determined variance.

5. A method as recited in claim 1 wherein the step of computing an average weighted functional score for the features of each group in the data processing system comprises the substeps of:
(A) multiplying in the data processing system the functional value of each feature of the group and the importance weight of the corresponding feature,
(B) summing in the data processing system the products obtained in step (A), and
(C) dividing in the data processing system the sum obtained in step (B) by the sum of the importance weights of all features of the group.

6. A method as recited in claim 1 comprising the additional steps of:
providing in the data processing system an overall average weighted functional score of the average weighted functional scores of each of the nodes;
providing in the data processing system the variance of the overall average weighted functional score; and
displaying on the output device a Normal Curve of the overall average weighted functional score having the provided variance.

7. A method as recited in claim 1 wherein:
the step of displaying on the output device a first line having a length corresponding to the average weighted functional score of a first group comprises displaying on the output device the first line with a length equal to the average weighted functional score of the first group divided by the sum of the weights of all of the groups; and
the step of displaying on the output device a succeeding line having a length corresponding to the average weighted functional score of the next group comprises displaying on the output device the succeeding line with a length equal to the average weighted functional score of the next group divided by the sum of the importance weights of all of the groups.

8. A method as recited in claim 1 wherein:
the step of displaying on the output device a first line comprises displaying on the output device the first line in color on a color output device; and
the step of displaying on the output device a succeeding line comprises displaying the succeeding line in color on the color output device.

9. A method for displaying descriptive data on an output device of a data processing system relating to a candidate having a plurality of hierarchial descriptive levels, each of the levels including a plurality of nodes, each of the nodes (except the nodes of the lowest level) being associated with nodes of a next lower level, and the nodes of the lowest level each being associated with a plurality of features, the method comprising the steps of:

(1) assigning a functional value to each of the features;
(2) assigning an importance weight to each of the features;
(3) for each node of the lowest level, providing in the data processing system an average weighted functional score using the functional values and importance weights of the associated features;
(4) for each node of the lowest level, providing in the data processing system a functional value equal to the corresponding average weighted functional score obtained in the preceding step;
(5) for each node of the lowest level, assigning an importance weight;
(6) for each node of the next higher level, providing in the data processing device an average weighted functional score using the functional values and importance weights of the associated nodes of the level immediately below the next higher level;
(7) for each node of the next higher level, providing in the data processing system a functional value equal to the corresponding average weighted functional score obtained in the preceding step;
(8) for each node of the next higher level, providing in the data processing system an importance weight;
(9) repeating steps (6), (7), and (8) for each succeeding higher level;
(10) displaying on the output device a first vector as a line corresponding to said vector representing the functional values and the importance weights, the line having a length corresponding to the functional value of the first node of the highest level and extending at an angle corresponding to the importance weight of the first node of the highest level;
(11) displaying on the output device a succeeding vector as a line having a length corresponding to the functional value of the next node of the highest level and extending from a tip of the preceding line component at an angle corresponding to the importance weight of the next node of the highest level; and
(12) repeating the preceding step for each remaining node of the highest level.

10. A method as recited in claim 9 wherein each angle is equal to the angle whose sine is the importance weight of the corresponding node.

11. A method as recited in claim 9 wherein:
step (3) of providing an average weighted functional score for each node of the lowest level comprises the substeps of:
(3A) providing in the data processing system the product of the functional value of each feature of the node and the importance weight of the corresponding feature,
(3B) providing in the data processing system the sum of the products obtained in (3A), and (3C) providing in the data processing system the quotient of the sum obtained in (3B) and the sum of the importance weights of all features of the node; and
step (6) of providing an average weighted functional score for the nodes of the next higher level comprises the substeps of:
(6A) providing in the data processing system the product of the functional value of each associated node of the level immediately below the next higher level and the importance weight of the corresponding associated node, (6B) providing in the data processing system the sum of the products obtained in (6A), and (6C) providing in the data processing system the quotient of the sum obtained in (6B) and the sum of the importance weights of all associated nodes of the level immediately below the next higher level.

12. A method as recited in claim 9 comprising the additional steps of:

providing in the data processing system an overall average weighted functional score of the average weighted functional scores of each of the highest level nodes;

providing the variance of the overall average weighted functional score; and displaying on the output device a Normal Curve of the overall average weighted functional score having the provided variance.

13. A method as recited in claim 9, wherein the steps of displaying on the output device first and succeeding lines each comprise the substep of displaying on the output device a vector as a line having a length of zero as a dot.

14. A method as recited in claim 9, wherein:

the step of displaying on the output device a first vector as a line having a length corresponding to the functional value of the first node of the highest level comprises displaying on the output device the first line with a length equal to the functional value of the first node of the highest level divided by the sum of the importance weights of all associated nodes of the level immediately below the highest level; and the step of displaying on the output device a succeeding vector as a line having a length corresponding to the functional value of the next node of the highest level comprises displaying on the output device the succeeding line with a length equal to the functional value of the next node of the highest level divided by the sum of the importance weights of all associated nodes of the level immediately below the highest level.

15. A method as recited in claim 9, wherein the step of providing an importance weight for each node of the next highest level comprises the step of providing the importance weight to be assigned from the importance weights of nodes of the next lower level.

16. A method as recited in claim 9, wherein the step of displaying on the output device a first vector as a line comprises displaying on the output device the first line in color on a color output device, and the step of displaying a succeeding line comprises displaying on the output device the succeeding line in color on the color output device.

17. A method as recited in claim 16 comprising the steps of displaying on the output device a first set of numeric data corresponding to the first line and displaying on the output device a set of numeric data corresponding to each of the succeeding lines.

18. A method as recited in claim 17 wherein the step of displaying on the output device a first set of numeric data comprises displaying on the output device the first set of numeric data in the same color as the first line and the step of displaying on the output device a succeeding set of numeric data comprises displaying on the output device each succeeding set of numeric data in the same color as the corresponding succeeding line.

19. A method as recited in claim 9 comprising the steps of displaying on the output device a first set of numeric data corresponding to the first line and displaying on the output device a set of numeric data corresponding to each of the succeeding lines.

20. A method as recited in claim 9 comprising the additional steps of:

displaying on the output device a first intermediate vector as a line corresponding to a first intermediate level, the first intermediate level constituting a level other than the highest level, the first intermediate line having a length corresponding to the functional value of the first node of the first intermediate level and extending at an angle corresponding to the importance weight of the first node of the first intermediate level;

displaying on the output device a succeeding intermediate vector as a line having a length corresponding to the functional value of the next node of the first intermediate level and extending from a tip of the preceding line component at an angle corresponding to the importance weight of the next node of the first intermediate level; and repeating the preceding step for each remaining node of the first intermediate level.

21. A method as recited in claim 9, wherein:

the step of displaying on the output device a first intermediate line having a length corresponding to the functional value of the first node of the first intermediate level comprises displaying on the output device the first intermediate line with a length equal to the functional value of the first node of the intermediate level divided by the sum of the importance weights of all nodes of the intermediate level; and the step of displaying on the output device a succeeding intermediate vector as a line having a length corresponding to the functional value of the next node of the first intermediate level comprises displaying on the output device the succeeding intermediate vector as a line with a length equal to the functional value of the next node of the first intermediate level divided by the sum of the importance weights of all nodes of the intermediate level.

22. A method for displaying comparative data on an output device of a data processing system relating to a candidate having a plurality of hierarchial descriptive levels in a memory of the data processing system and evaluated according to a plurality of criteria, each of the levels including a plurality of nodes, each of the nodes (except the nodes of the lowest level) being associated with nodes of a next lower level, and the nodes of the lowest level each being associated with a plurality of features, the method comprising the steps of:

(1) selecting one of the criteria and assigning an importance weight to each of the features, according to the selected criterion;

(2) assigning a functional value to each of the features;

(3) providing in the data processing system an average weighted functional score of the associated features for each node of the lowest level;

(4) providing an importance weight to each node of the lowest level, according to the selected criterion;

(5) providing a functional value for each node of the lowest level equal to the average weighted functional score of the associated features obtained in (3);

(6) providing in the data processing system an average weighted functional score for the nodes of the lowest level;

(7) providing in the data processing system an importance weight to each node of the next higher level, according to the selected criterion;

(8) setting a functional value in the data processing system for each node of the next higher level equal to the average weighted functional score for the associated features of the next lower level;

(9) computing in the data processing system an average weighted functional score for the nodes of the next higher level;

(10) repeating steps (7), (8), and (9) for each succeeding higher level;

(11) displaying on the output device a first vector as a line having a length corresponding to the functional value of the first node of the highest level and extending at an angle corresponding to the importance weight of the first node of the highest level;

(12) displaying on the output device a second vector as a line having a length corresponding to the functional value of the second node of the highest level and extending from the tip of the first line at an angle corresponding to the importance weight of the second node of the highest level;

(13) displaying on the output device a succeeding vector as a line having a length corresponding to the functional value of the next node of the highest level and extending from the tip of the preceding line component at an angle corresponding to the importance weight of the next node of the highest level;

(14) repeating the preceding step for each remaining node of the highest level;

(15) selecting in the data processing system a different one of the criteria; and

(16) repeating steps 2 through 14, using the different selected criterion.

23. A data processing system for displaying descriptive data on an output device relating to a candidate having a plurality of hierarchial descriptive levels, each of the levels including a plurality of nodes, each of the nodes (except the nodes of the lowest level) being associated with nodes of a next lower level, and the nodes of the lowest level each being associated with a plurality of features, the apparatus comprising:

an input device to provide functional values assigned to each of the features, importance weights assigned to each of the features, and importance weights assigned to each of the nodes;

a processor coupled to the input device and responsive to the functional values assigned to each of the features, the importance weights assigned to each of the features, and the importance weights assigned to each of the nodes, to compute an average weighted functional score in accordance with the functional values and importance weights of the associated features;

a vector processor coupled to the processor and responsive to the functional values and importance weights to provide plurality of vectors, each having a vector length and a vector angle in accordance with the function values and importance weights; and a display coupled to the vector processor to display a first vector as a line, the line having a length corresponding to the functional value of the first node of the highest level and the line extending at an angle with respect to a reference corresponding to the importance weight of the first node of the highest level, and to display succeeding lines as corresponding succeeding lines, each succeeding line having a length corresponding to the functional value of the next node of the highest level and extending from a tip of a preceding line component at an angle With respect to the reference corresponding to the importance weight of the next node of the highest level for each remaining node of the highest level.

* * * * *